United States Patent
Cox et al.

(10) Patent No.: US 11,838,892 B2
(45) Date of Patent: *Dec. 5, 2023

(54) WAKE UP SIGNAL FOR MACHINE TYPE COMMUNICATION AND NARROWBAND-INTERNET-OF-THINGS DEVICES

(71) Applicant: Apple Inc., Cupertino, CA (US)

(72) Inventors: Timothy F. Cox, Palo Alto, CA (US); Seunghee Han, San Jose, CA (US); Debdeep Chatterjee, San Jose, CA (US); Vallabhajosyula S. Somayazulu, Portland, OR (US); Qiaoyang Ye, San Jose, CA (US); Salvatore Talarico, Sunnyvale, CA (US); Maruti Gupta Hyde, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,437

(22) Filed: Jan. 31, 2022

(65) Prior Publication Data

US 2022/0201649 A1    Jun. 23, 2022

Related U.S. Application Data

(63) Continuation of application No. 16/495,778, filed as application No. PCT/US2018/023822 on Mar. 22, 2018, now Pat. No. 11,284,372.

(Continued)

(51) Int. Cl.
*H04W 68/02*    (2009.01)
*H04W 52/02*    (2009.01)

(52) U.S. Cl.
CPC ....... *H04W 68/02* (2013.01); *H04W 52/0229* (2013.01)

(58) Field of Classification Search
None
See application file for complete search history.

(56) References Cited

U.S. PATENT DOCUMENTS 8,301,176 B1    10/2012    Yellin et al.
10,568,067 B2    2/2020    Wong et al.
(Continued)

FOREIGN PATENT DOCUMENTS

CN    103947278 A    7/2014
CN    104335630 A    2/2015

OTHER PUBLICATIONS

"International Application Serial No. PCT/US2018/023822, International Search Report dated Jul. 10, 2018", 3 pgs.

(Continued)

*Primary Examiner* — Brian S Roberts
(74) *Attorney, Agent, or Firm* — Kowert, Hood, Munyon, Rankin & Goetzel, P.C.

(57) ABSTRACT

Systems and methods of reducing power consumption associated with paging or cDRX mode are described. A wake-up receiver (WUR) wakes up from an idle mode or cDRX state. Whether a wake-up signal (WUS) has been received by the WUR is determined. The WUS is a low-complexity signal that is less complicated than a PDCCH or PDSCH and is repeated multiple times at resource elements as indicated in a configuration from an eNB. If received, a baseband transceiver wakes up for reception of a PDCCH for the UE in a PO when the UE is in the idle mode or a PDSCH for the UE when the UE is in the cDRX state.

25 Claims, 21 Drawing Sheets

Related U.S. Application Data

(60) Provisional application No. 62/588,086, filed on Nov. 17, 2017, provisional application No. 62/565,803, filed on Sep. 29, 2017, provisional application No. 62/544,252, filed on Aug. 11, 2017, provisional application No. 62/544,255, filed on Aug. 11, 2017, provisional application No. 62/502,386, filed on May 5, 2017, provisional application No. 62/476,431, filed on Mar. 24, 2017.

(56) References Cited

U.S. PATENT DOCUMENTS

| | | | |
|---|---|---|---|
| 11,284,372 B2* | 3/2022 | Cox | H04W 52/0216 |
| 2010/0178942 A1* | 7/2010 | Laroia | H04W 68/025 |
| | | | 455/458 |
| 2012/0122511 A1* | 5/2012 | Antonio | H04W 52/028 |
| | | | 455/522 |
| 2013/0343291 A1* | 12/2013 | Gao | H04W 52/244 |
| | | | 370/329 |
| 2014/0112221 A1 | 4/2014 | Verger et al. | |
| 2014/0211752 A1 | 7/2014 | Berggren et al. | |
| 2015/0215989 A1 | 7/2015 | Bangolae et al. | |
| 2016/0007406 A1 | 1/2016 | Yi et al. | |
| 2016/0014716 A1 | 1/2016 | Tabet et al. | |
| 2016/0020822 A1 | 1/2016 | Li et al. | |
| 2016/0044578 A1 | 2/2016 | Vajapeyam et al. | |
| 2016/0128128 A1 | 5/2016 | Ang et al. | |
| 2016/0295636 A1 | 10/2016 | Yang et al. | |
| 2017/0127381 A1 | 5/2017 | Yavus et al. | |
| 2017/0273078 A1 | 9/2017 | Rico Alvarino et al. | |
| 2018/0249440 A1 | 8/2018 | Zhang et al. | |
| 2018/0317198 A1 | 11/2018 | Lee et al. | |
| 2019/0239189 A1 | 8/2019 | Hwang et al. | |
| 2020/0022082 A1 | 1/2020 | Ljung et al. | |
| 2020/0077338 A1 | 3/2020 | Sui et al. | |

OTHER PUBLICATIONS

"International Application Serial No. PCT/US2018/023822, Written Opinion dated Jul. 10, 2018", 13 pgs.

Rapeepat, Ratasuk, et al., "Overview of narrowband IoT in LTE Rel-13", In: 2016 IEEE Conference on Standards for Communications and Networking (CSCN), (Nov. 2, 2016).

Huawei, et al., "Discussion on Wake Up Signal"; 3GPP TSG RAN WG1, Meeting #88, R1-1703333; Athens, Greece, Feb. 2017; 5 pgs.

Catt, "Wakeup Signal for On-Demand Access for UE Power Saving in NR System Design"; 3GPP TSG RAN WG1, Meeting #88; R1-1702096; Athens, Greece; Feb. 2017; 3 pgs.

Intel, "On Further Evolution of eMTC and NB-IoT in Rel-15 LTE"; 3GPP TSG RAN, Meeting #75; RP-170429; Dubrovnik, Croatia; Mar. 2017; 14 pgs.

Qualcomm Incorporated, "UE Power Evaluation for DRX with Wake-Up Signaling"; 3GPP TSG-RAN WG1 NR AdHoc; R1-1700820; Spokane, USA; Jan. 2017; 7 pgs.

Chinese Office Action; Application No. 201880020888.1; dated Jul. 22, 2022; 22 pgs.

* cited by examiner

WAKE UP SIGNAL FOR MACHINE TYPE COMMUNICATION AND NARROWBAND-INTERNET-OF-THINGS DEVICES

PRIORITY CLAIM

This application is a continuation of U.S. patent application Ser. No. 16/495,778, filed Sep. 19, 2019, entitled "WAKE UP SIGNAL FOR MACHINE TYPE COMMUNICATION AND NARROWBAND-INTERNET-OF-THINGS DEVICES," which was a U.S. National Stage Filing under 35 U.S.C. 371 from International Application No. PCT/US2018/023822, filed Mar. 22, 2018, entitled "WAKE UP SIGNAL FOR MACHINE TYPE COMMUNICATION AND NARROWBAND-INTERNET-OF-THINGS DEVICES," and which claims the benefit of priority to U.S. Provisional Patent Application Ser. No. 62/476,431, filed Mar. 24, 2017, entitled "WAKE UP SIGNAL FOR EVEN FURTHER ENHANCED MACHINE TYPE COMMUNICATION AND EVEN FURTHER ENHANCED NARROWBAND-INTERNET-OF-THINGS," U.S. Provisional Patent Application Ser. No. 62/502,386, filed May 5, 2017, entitled "WAKE UP SIGNAL FOR EVEN FURTHER ENHANCED MACHINE TYPE COMMUNICATION AND FURTHER ENHANCED NARROWBAND INTERNET OF THINGS," U.S. Provisional. Patent Application Ser. No. 62/544,252, filed Aug. 11, 2017, entitled "DESIGN AND DETECTION OF A WAKE-UP SIGNAL PREAMBLE FOR EVEN FURTHER ENHANCED MACHINE TYPE COMMUNICATION (EFEMTC)," U.S. Provisional Patent Application Ser. No. 62/544,255, filed Aug. 11, 2017, entitled "DESIGN AND DETECTION OF A WAKE-UP SIGNAL PREAMBLE FOR FURTHER ENHANCED NARROWBAND INTERNET OF THINGS (FENB-IOT)," U.S. Provisional Patent Application Ser. No. 62/565,803, filed Sep. 29, 2017, entitled "ASSIGNING AND CONFIGURING RESOURCES FOR A WAKE-UP SIGNAL FOR EVEN FURTHER ENHANCED MACHINE TYPE COMMUNICATION (EFEMTC)/NARROWBAND INTERNET OF THINGS (NB-IOT) AND LONG TERM EVOLUTION (LTE)," and U.S. Provisional Patent Application Ser. No. 62/588,086, filed Nov. 17, 2017, entitled "PERIODIC SYNCHRONIZATION SIGNAL AND NON-PERIODIC WAKE-UP SIGNAL FOR EVEN FURTHER ENHANCED MACHINE TYPE COMMUNICATIONS," each of which is incorporated herein by reference in its entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to Even Further Enhanced Machine Type Communication (efeMTC) user equipment (UEs) and Narrowband (NB)-Internet of Things (IoT) UEs in cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to wake-up signals for MTC UEs and NB-IOT UEs.

BACKGROUND

The use of 3GPP LTE systems (including LTE and LTE-A systems) has increased due to both an increase in the types of devices user equipment (UEs) using network resources as well as the amount of data and bandwidth being used by various applications, such as video streaming, operating on these UEs. In particular, both typical UEs such as cell phones and Internet of Things (IoT) UEs currently use 3GPP LTE systems. The latter such UEs, which may include machine-type communications (MTC) UEs pose particular challenges as such UEs are typically low cost devices that have low power consumption, and thus have smaller batteries. Examples of such UEs include sensors (e.g., sensing environmental conditions) or microcontrollers in appliances or vending machines. The number of MTC UEs and NB-IOT UEs in use is expected to be massive, thus leading to further development as networks attempt to accommodate for the disparate requirements of the different types of UEs. Work is ongoing to introduce enhancements to achieve even lower power consumption, to make more efficient use of network resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
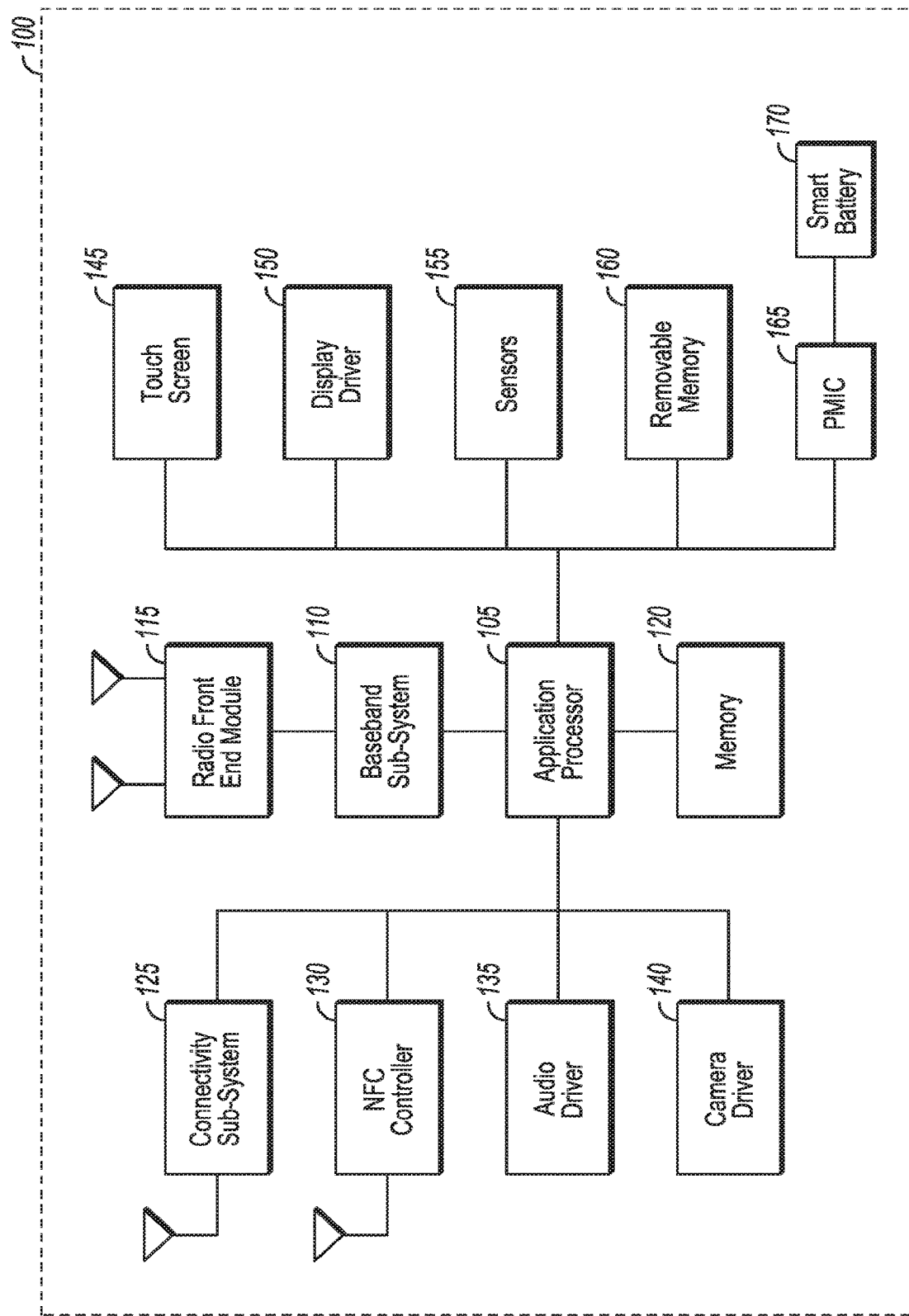
FIG. 1 illustrates a UE in accordance with some embodiments.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
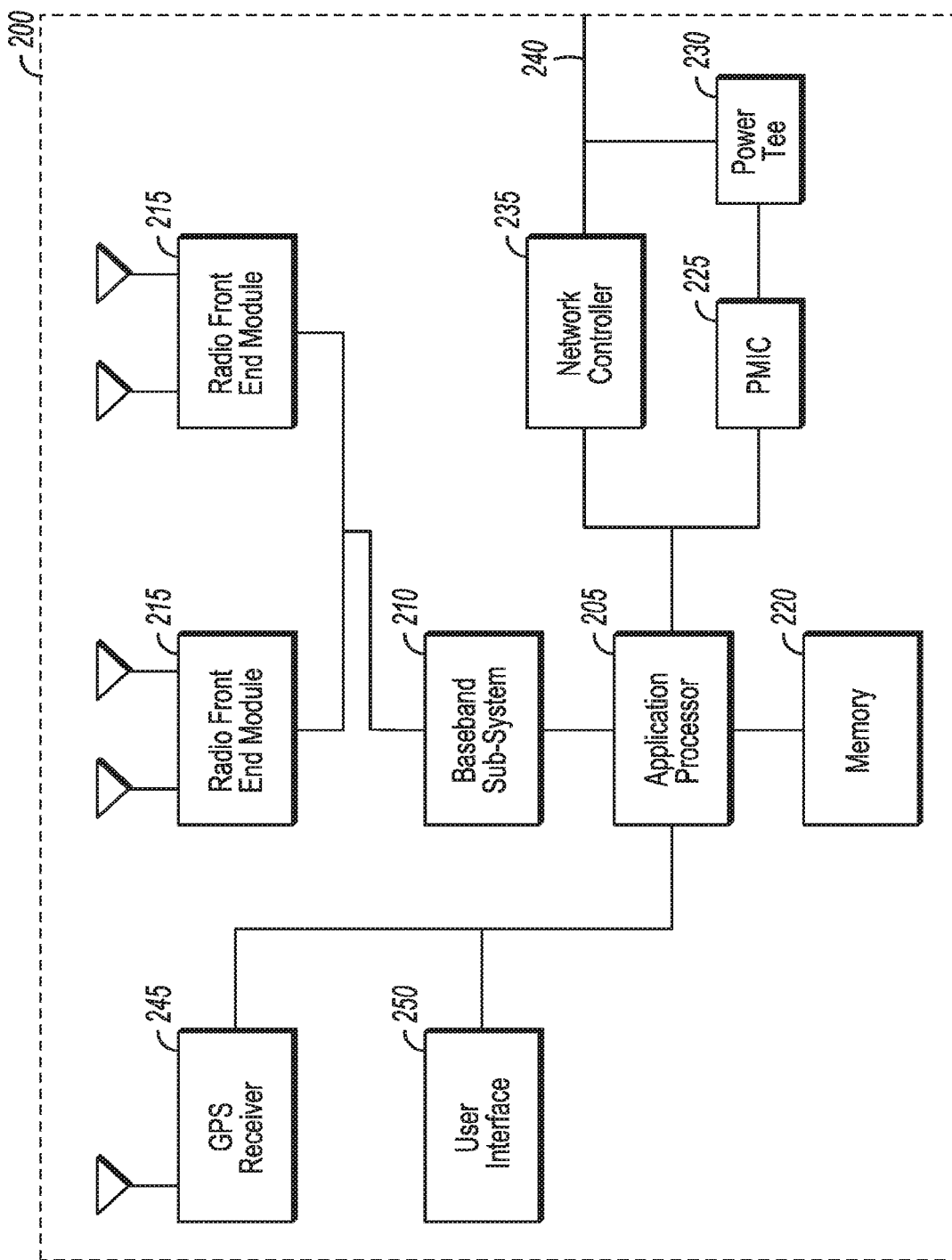
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, I²C or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS). Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
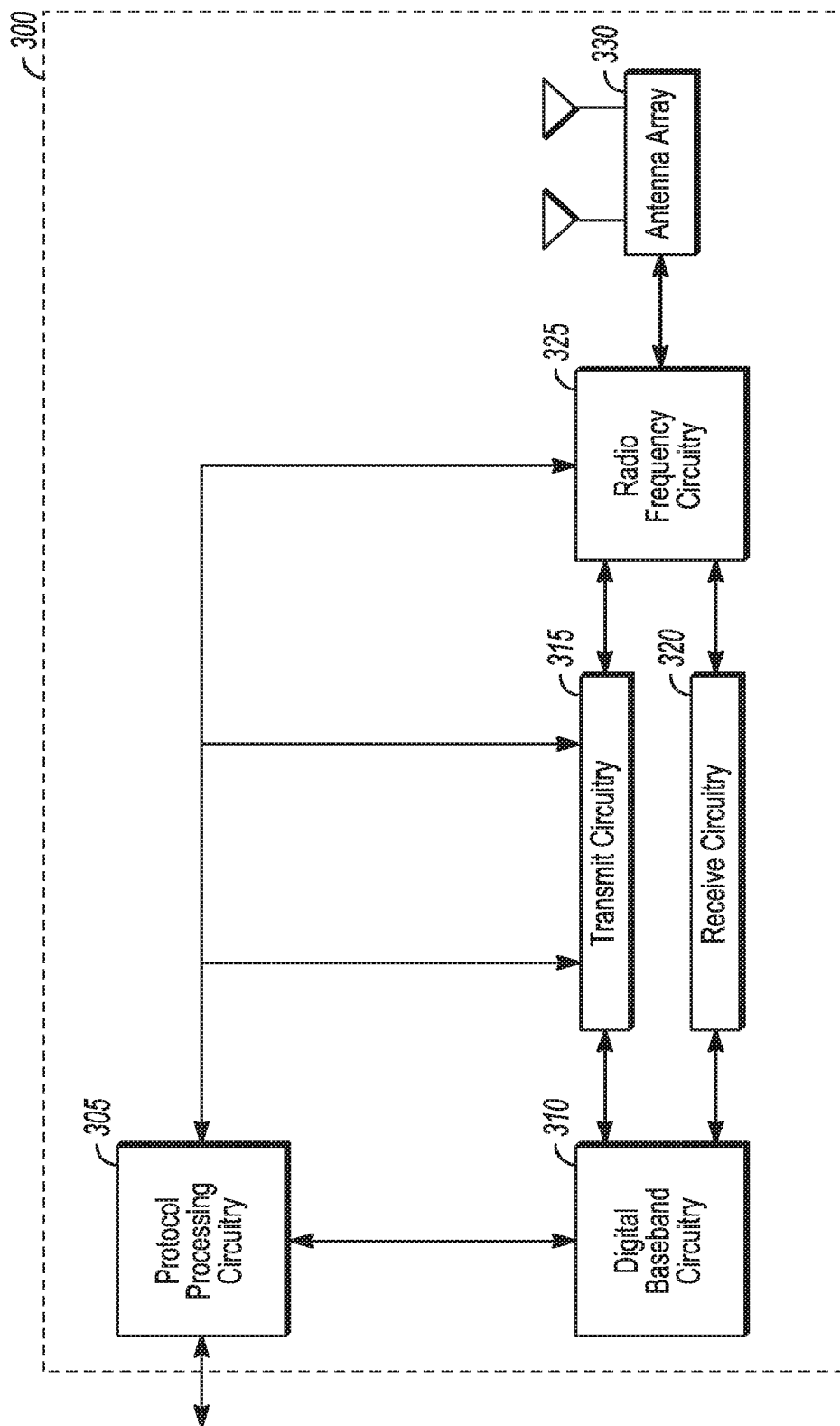
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry. In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry. IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface subsystem may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
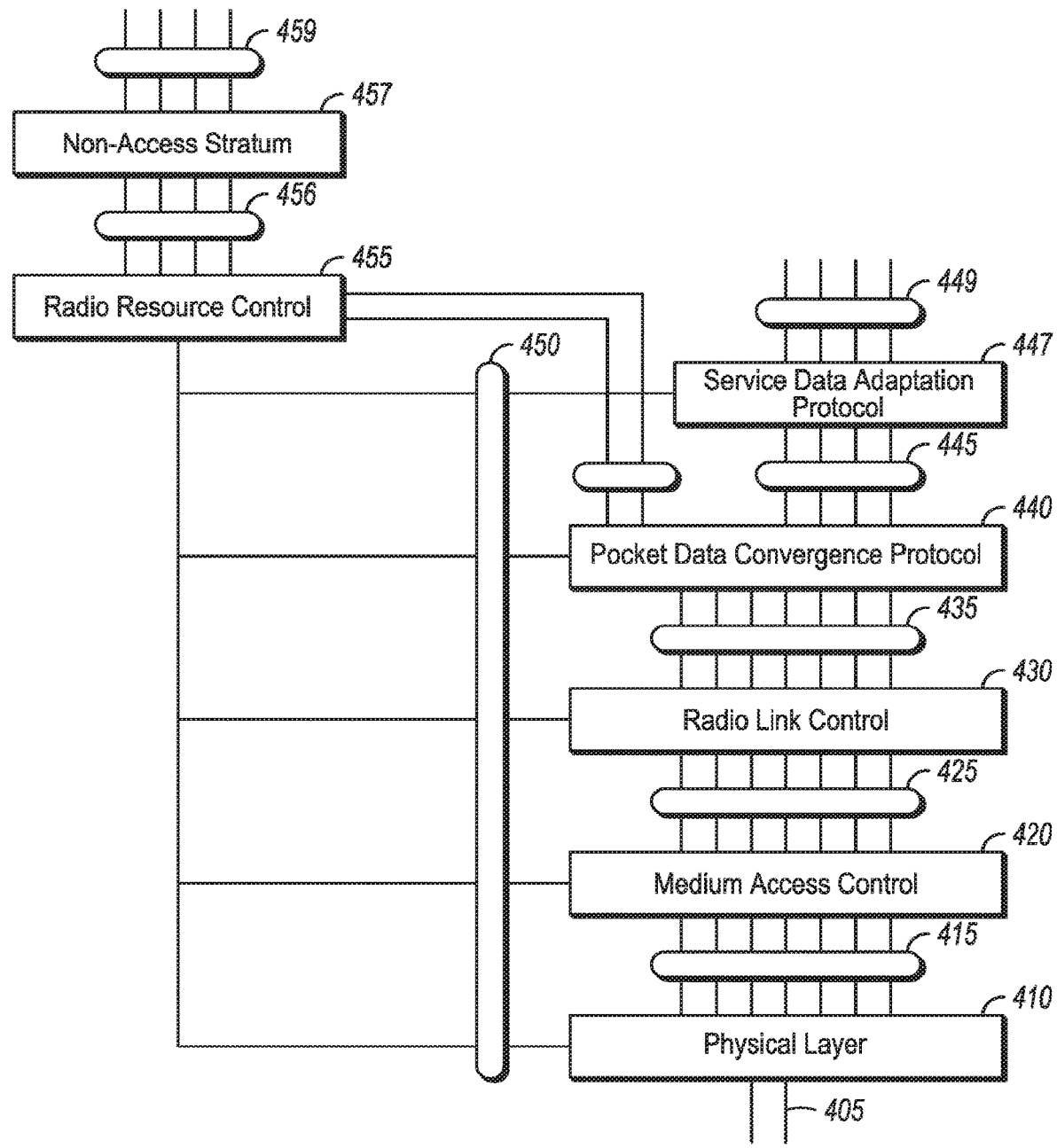
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 420 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
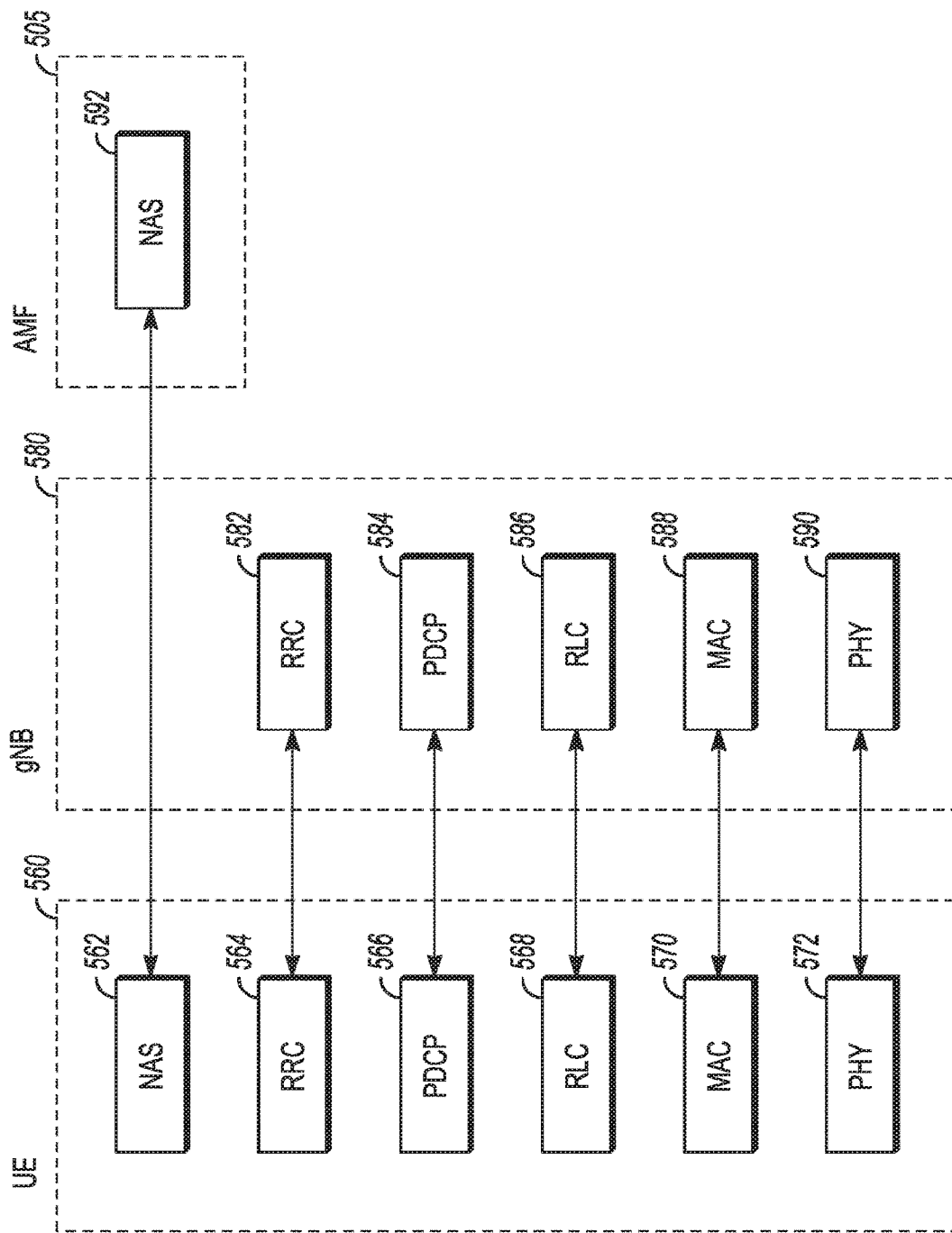
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects. UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, $T_s$ may be defined as 1/(30,720×1000) seconds. According to some aspects, a radio frame may be defined as having duration 30.720·$T_s$, and a slot may be defined as having duration 15.360·$T_s$. According to some aspects, $T_s$ may be defined as $$T_s=1/(\Delta f_{max} \cdot N_f),$$

where $\Delta f_{max}$=480×10³ and Nf=4.096. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams. Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-1)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i) p_T(t - T_{sym}) \exp[j2\pi f_k(t - T_{sym} - \tau_k)]$$

Where $p_T(t)$ is a prototype filter function, $T_{sym}$ is the start time of the symbol period, $\tau_k$ is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k, l) where k is the index number of subcarrier, in the range 0 to N.M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes.

The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity. According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may, be configured with a set of parameters for each of one or more logical channels, each set including parameters which may include one or more of a prioritized bit rate (PBR) and a bucket size duration (BSD).

Figure 6:
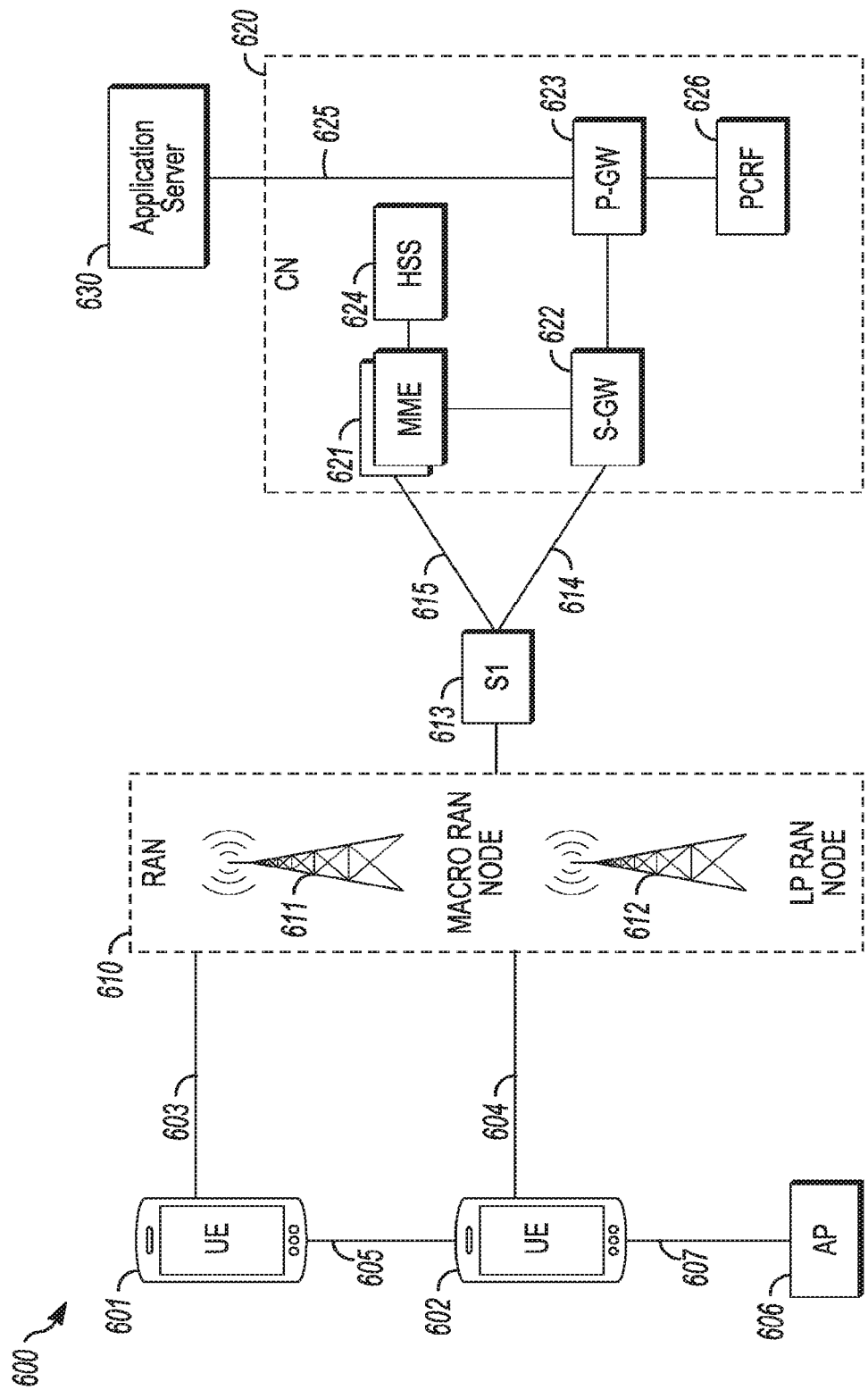
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as NB-IoT or CAT-M1 (eMTC) for exchanging data with an MTC server or device via a public land mobile network (PLMN), Proximity-Based Service (ProSe) or device-to-device (D2D) communication, sensor networks, or IoT networks. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (IISS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions. PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

As above, for many new devices, power consumption may be of primary importance, in particular for eMTC and NB-IoT UEs. Paging and connected mode Discontinuous Reception (cDRX) may be supported in eMTC and NB-IoT. Without the DRX mode, the UE may be continuously awake to decode downlink data, as the data in the downlink may arrive at any time. This means that UE may monitor the Physical Downlink Control Channel (PDCCH) in every subframe, which may consume a substantial amount of power. The DRX mode may allow the UE to save battery power by waking up only at predefined time instants to monitor the PDCCH. Though this may reduce the power drain to certain extent, the monitoring of the PDCCH still consumes a substantial amount of power, e.g. on average 10-12% of the UE's battery.

To further reduce the power consumption, a physical signal/channel that can be efficiently decoded or detected for idle mode paging to and/or cDRX may be introduced. This physical signal/channel is called herein a wake-up signal (WUS). The WUS can be used during idle mode paging and/or cDRX. Note that below, the terms PDSCH and PDCCH are used for simplicity. PDSCH may refer to a PDSCH in eMTC systems or a NPDSCH in NB-IoT systems. PDCCH may likewise refer to a MPDCCH in eMTC systems and a NPDCCH in NB-IoT systems.

Figure 7:
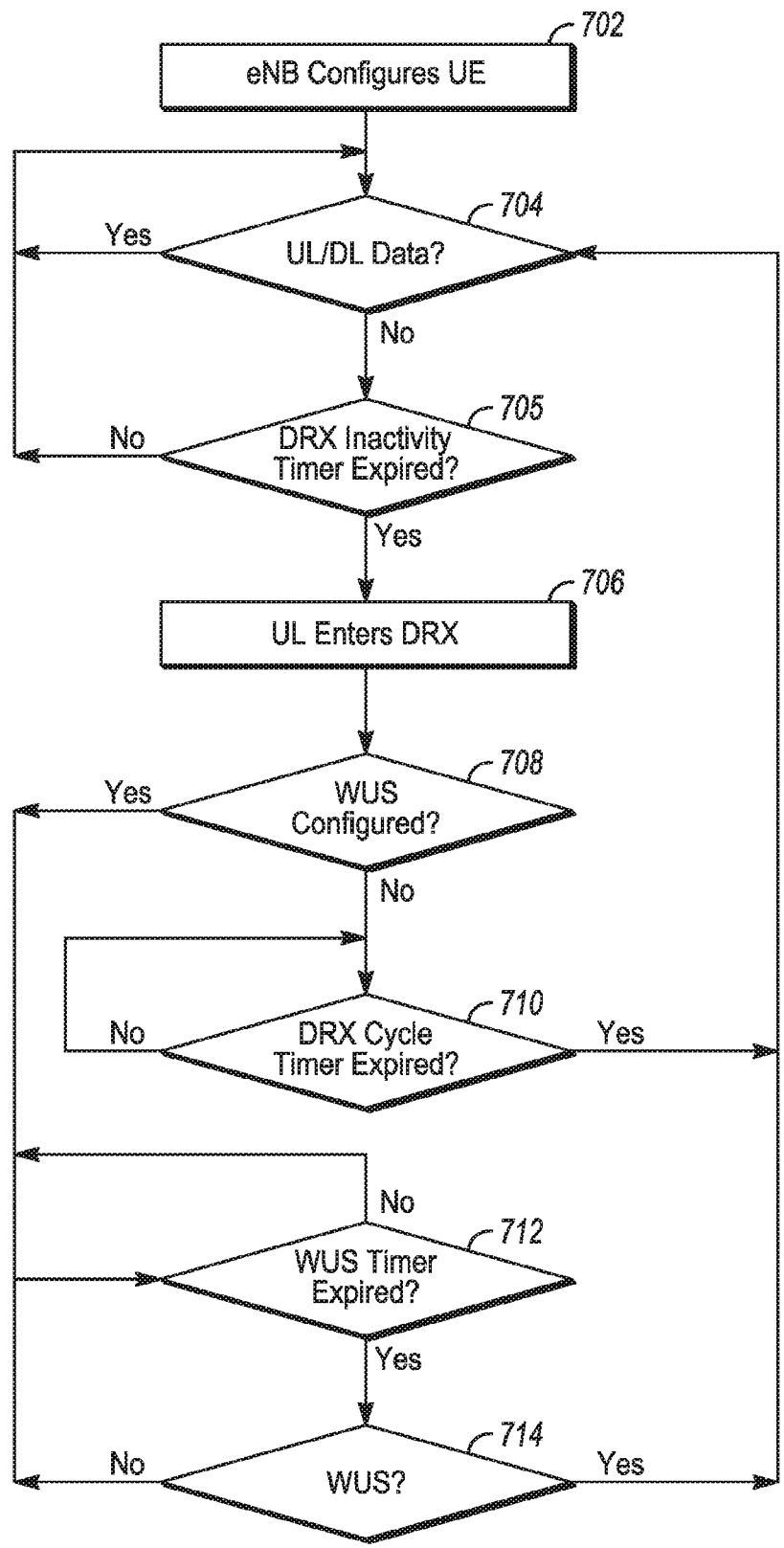
FIG. 7 illustrates wake up signal flowchart in accordance with some embodiments.

FIG. 7 illustrates wake up signal flowchart in accordance with some embodiments. The various operations may be performed by the UE and/or eNB shown in FIGS. 1-6. In various embodiments, additional or fewer operations may be present.

At operation 702, the eNB may configure the UE. The configuration may occur via RRC messages during initial attachment or later. The configuration may include timers for idle mode DRX and cDRX, as well as WUS. In some embodiments, the WUS resource allocation may also be configured. The eNB may also configure by sending information using system information messages (SI) by using System Information Blocks (SIBs).

At operation 704, the eNB and UE may communicate control signals and user data. Both UL and DL data may be communicated until no data is communicated for a time indicated by the drx-Inactivity-Timer. This is indicated at operation 705 by determining whether the DRX Inactivity Timer has expired.

After the drx-Inactivity-Timer expires, the UE may enter the DRX mode at operation 706. If configured, the UE may enter a short DRX cycle prior to the long DRX cycle. Timers for both DRX cycles may be configured by the eNB.

The next set of operations depends on whether the WUS has been configured. At operation 708, the UE may determine whether the WUS has been configured. Whether or not the WUS has been configured may depend on whether the UE is in coverage enhancement (CE) mode, or which CE mode the UE is in.

If WUS has not been configured, the UE may at operation 710 determine whether the appropriate DRX cycle timer (short or long) has expired. The UE may remain in DRX mode until the DRX timer expires. After the DRX timer expires, an onDurationTimer configured by the eNB may specify the number of consecutive subframes over which the UE reads the PDCCH after every DRX cycle before entering the power saving mode.

If the WUS has been configured, at operation 712 the UE may determine whether the WUS timer has expired. The WUS timer may be a different timer than either the short or long DRX cycle timer or the WUS timer may be the same as the DRX timer, but may start at a different offset with respect to the DRX timer. The WUS timer may have a shorter period than the long DRX cycle timer. The UE may remain in DRX mode independent of the WUS timer, in some embodiments the DRX mode ending only if the UE discovers a PDCCH grant during PDCCH monitoring or if the UE is to transmit data.

If the WUS has been configured, at operation 714 the UE may determine whether a WUS is present at the predetermined location where the WUS is supposed to arrive for that UE. The WUS resource may be configured for the UE or group of UEs via higher layer signaling. The eNB may first send a WUS on the WUS occasion (WO) resource when there is DL control message such as a Paging message (on a PDCCH) or data (on a PDSCH) to be sent during a paging occasion when the UE is in idle mode DRX or during the On Duration in when the UE is in cDRX. The WUS may be significantly less complicated, for example carrying a single bit, than a PDCCH. As the WUS may be less complicated than a PDCCH, decoding the WUS may be computationally less complex than decoding the PDCCH and thus use less power than decoding the PDCCH. The UE in idle mode DRX or cDRX may use a wake-up receiver to detect the WUS and may only wake up the baseband processor when a WUS is detected. The WUS may comprise a sequence and may additionally include a payload.

In general, the sequence should facilitate easy detection using low power receivers and maintain very low cross-correlation with existing signals defined in LTE or NB-IoT, such as the (Narrowband) Primary Synchronization Signal ((N)PSS), (Narrowband) Secondary Synchronization Signal ((N)SSS), or UL (e.g., PUSCH/PUCCH in efeMTC or NPUSCH in feNB-IoT) DMRS.

In one embodiment, the sequence can be any constant amplitude zero autocorrelation (CAZAC) sequence, e.g., a Zadoff-Chu (ZC) sequence. For example, NPSS/NSSS, PSS or DMRS can be used. To differentiate the sequence from a legacy NPSS/NSSS/PSS, a ZC sequence with a different root index and/or of a different length may be used. For example, NPSS/NSSS may occupy 11 symbols, but the WUS may occupy 2-4 symbols over 12 sub-carriers.

In one example, a ZC sequence with length 11 and root index 6 can be used. The cover code can be the same as the cover code used for the NPSS in Rel-13 NB-IoT. The use of a complex conjugate sequence of Rel-13 NPSS may help to reduce some complexity. As another example, a NSSS sequence with a different scrambling sequence can be used. A scrambling sequence that is orthogonal to the existing 4 scrambling sequences in Rel-13 NB-IoT can be used, e.g. a Hadamard sequence generated as $b(n)=Hadamard_x^{128 \times 128}$ (mod(n, 128), where x can be any integer within $\{1\ 2, \ldots, 30, 32, 33, \ldots, 62, 65, \ldots, 126\}$.

For standalone and guard-band scenarios, all 14 symbols in one subframe can be used for the WUS. Alternatively, the WUS design and mapping may be the same for all operation modes.

In other embodiments, rather than being a CAZAC sequence, the sequence can be any pseudo-random sequence. For example, a Cell Specific Reference Signal (CRS)/Narrowband Reference Signal (NRS) or SSS can be used as the sequence. To differentiate from a legacy CRS/NRS or SSS, different pseudo-random sequences and/or additional scrambling sequences can be used. As another example, Positioning Reference Signal (PRS)/Narrowband PRS (NPRS) can be used. The eNB configuration may avoid the use of WUS using PRS/NPRS for UE positioning measurement.

For the above alternatives, the set of sequences may be common to all cells, cell-specific (e.g. depending on cell ID), UE-group specific, or UE-specific sequence. If the WUS is common to all cells, a default cell ID can be used (e.g. ID 0) to generate the sequence when the sequence generation depends on cell ID in LTE/Rel-13 NB-IoT/eMTC systems. For example, if the WUS sequence is based on any one of the following signals—PSS, SSS, NSSS, CRS, NRS, PRS or NPRS—a default cell ID can be used to generate the sequence. On the other hand, if the WUS is cell-specific, the sequence can be defined as a function of the cell ID.

For a UE-group/UE-specific WUS design, various designs can be considered. In one embodiment, the sequence associated with each UE can be configured by the eNB, e.g. via RRC signaling. In another embodiment, a predefined mapping can be used to associate the UE-group to the sequence used for the WUS. For example, the number of sequences that can be used for the WUS may be denoted by N. The sequence to be associated to a particular UE (if a UE-specific WUS is introduced) or a particular UE group (if a UE-group specific WUS is introduced) can be determined by mod(UE/UE-group ID. N), e.g. the UE ID can be the Cell Radio Network Temporary Identifier (C-RNTI) and the UE-group ID can be indicated by higher layer signaling.

The signals in LTE/NB-IoT/eMTC systems may depend on the subframe/slot index as well, e.g. SSS/NSSS/CRS/NRS/PRS/NPRS. If the WUS sequence is based on such signals, whose generation depends on subframe/slot index, in one example, a default value of subframe/slot index can be used (e.g. 0) to generate the sequence for the WUS. Alternatively, the sequence generation can still depend on the subframe/slot index. In the latter case, the UE either may keep the DL synchronized or may perform a hypothesis test to obtain the timing information for the cell.

In some embodiments, additional indication information can be carried by the sequence rather than the WUS merely indicating the presence of a PDCCH or PDSCH. Note that this may result in a tradeoff against an increased chance of a false alarm. In some embodiments, different sequences (e.g., in terms of root index/CS/intra-symbol or inter-symbol OCC) can be used to indicate specific information, e.g. for a system information (SI) update and for public warning system (PWS)-related information. In some embodiments, different sequences (e.g., in terms of root index/CS/intra-symbol or inter-symbol OCC) may also indicate the resource allocation or TBS/MCS related to scheduling info of the following data (payload) part.

In some embodiments, the sequence may be modified to account for the overlapping CRS signals from LTE if the sequence is sent in-band (e.g. for NB-IoT or efeMTC UEs). For example, the resource element (RE) mapping may be the same (as if there are no CRS/NRS), while the sequence on the REs carrying the CRS/NRS can be punctured. Alternatively, the sequence can be mapped to the REs excluding the REs containing the CRS/NRS, i.e., the sequence may be rate-matched around the CRS/NRS REs. If the number of available REs for carrying the WUS is less than the length of the WUS sequence, the remaining elements of the sequence may be punctured. That is, some of the REs (the CRS/NRS REs) may be punctured and others may not be punctured.

In some embodiments, when a sequence contains a payload, the same sequence used for time/frequency synchronization and/or channel estimation may be used for coherent demodulation of the payload part. Note that the sequence can be the same for both efeMTC and feNB-IoT, i.e. spanning up to 1 PRB. Alternatively, different sequences can be applied dependent on the UE capability, which may be provided in a UE capability information element in RRC signaling during attachment. For example, different sequences may be applied to eMTC and NB-IoT, where the sequence can have up to 6 PRBs for the efeMTC and 1 PRB for the feNB-IoT. The control region, which can be indicated by a system information broadcast (SIB) or predefined, e.g to 3 symbols, can be reserved for the efeMTC and feNB-IoT in-band mode. This is to say that in this embodiment, the sequence in the WUS does not occupy the RE in the LTE control region.

In one embodiment, instead of sending a sequence, the UE could use cyclic prefix tracking as to obtain time/ frequency synchronization and allow the UE to detect the presence of a wake-up signal at a pre-determined time/frequency window selected for the wake-up signal. The WUR in this case may track the cyclic prefix in the first 3 OFDM symbols, especially for the in-band case where the cyclic prefix is fixed for the LTE PDCCH symbols. Note that this may be coverage dependent—e.g., cyclic prefix tracking may be used in areas of good coverage. In enhanced coverage mode, additional symbols may be used for synchronization and/or presence detection of the WUS.

The WUS can include a payload in addition to a preamble. The payload may include the ID of UEs to wake up for monitoring ps aging message or for monitoring the (M/N) PDCCH during connected DRX states. In one embodiment, the WUS can include the paging message and replace the paging mechanism.

In some embodiments, the WUS may indicate a PDCCH without a PDSCH for the UE. A UE-group search space (SS) or common search space (CSS) can be defined if the WUS is to be signaled to multiple UEs. Alternatively, the WUS can be UE-specific for waking up a particular UE during cDRX.

The RNTI used to scramble the PDCCH may take various forms. In one embodiment, a new 16-bit or shorter (8-bit) RNTI, referred to as a "WU-RNTI", can be defined to scramble the cyclic redundancy code (CRC) of the payload carried in the PDCCH. As another example, multiple such WU-RNTIs could be concatenated to improve WUS efficiency. Alternatively, the paging RNTI (P-RNTI) can be reused for WUS transmitted in relation to Idle mode paging purposes, especially if the intent is to signal a broadcast message (e.g. change in SI updates) and to wake up multiple UEs.

The C-RNTI may be used for waking up a UE during cDRX. For the DCI format design, the PDCCH can reuse an existing DCI format in LTE, e.g. DCI format 1A/1C. or DCI format in feMTC/eNB-IoT, e.g. DCI format 6-2/N2. The bits in the DCI can be re-interpreted for an indication of SI modification, IDs of UEs to wake up in a paging occasion (PO) or UEs to receive DL control/data in the following subframe in cDRX on duration, and/or an Earthquake and Tsunami Warning System/Commercial Mobile Alert System (ETWS/CMAS) notice. A new RNTI can be introduced for such a DCI. In one embodiment, extension from DCI format 1A/1C in existing LTE can be used. In another embodiment, an extension from DCI format 6-2 or DCI format N2 can be used.

Alternatively, a new DCI format can be defined. The new DCI format may contain an indication of SI modification, IDs of UEs to wake up in a PO or UEs to receive DL control/data in following subframe in cDRX on duration, and/or a ETWS/CMAS notice. In some embodiments, an existing RNTI can be used. Alternatively, a new RNTI can be defined and used with the new DCI format.

In some embodiments, the WUS may indicate a PDSCH without a PDCCH for the UE. The PDSCH can be unicast to a specific UE. Alternatively, the PDSCH can be multicast to a group of UEs. A new 24-bit or shorter (e.g., 16-bit) WU-RNTI can be defined to scramble the CRC of the payload carried in the PDSCH. Alternatively, the P-RNTI can be reused for the WUS transmitted in relation to idle mode paging purposes and the C-RNTI may be used for waking up a UE during cDRX. As yet another alternative, a new 24-bit or shorter (16-bit) RNTI can defined as a function of the UE ID.

For TBS/MCS, the resource size, number of repetitions, and TBS/MCS can be predefined in the specifications. Alternatively, these characteristics may be configured via signaling, such as MIB/SIB signaling, during a capability exchange between the UE and the eNB or RRC message configurations. Alternatively, the preamble part (sequence) can indicate the scheduling information. For example, a set of potential resource size, repetition levels (RLs) and TBS/MCS may exist for the PDSCH; the preamble may indicate one out of these candidates, e.g. via an index in the candidate set.

In general, the WUS preamble may be designed such that the wake-up receiver (which may be part of the processing circuitry) in the UE is able to distinguish when the WUS is present vs. when the WUS is not present (i.e. noise or some other information or a different signal) within a given time/frequency window of uncertainty. The window of uncertainty may, in turn, depend on the device carrier frequency offset and the clock drift of the Real Time Clock (RTC) in the UE. The design of the WUS may depend on the functional requirements of the WUS, i.e. a) whether or not the WUS is always sent during the wake-up epoch, b) whether or not the WUS provides synchronization and c) whether the WUS is used to further demodulate a payload.

It may be desirable for a WUS preamble design to satisfy the criteria for missed detection probability and false alarm probability, while at the same time not employing prior DL synchronization using existing synchronization signals. This may allow the wake-up receiver to obtain the information in a very short amount of time, thus saving energy spent acquiring downlink synchronization through the primary, secondary NB sync signals and monitoring and decoding the downlink control channel etc.

A novel detection mechanism at the receiver is described that allows the wake-up signal preamble to be detected even when the preamble is not sent at every wake-up epoch. This allows the network to re-use the resource for other purposes, if it so chooses. If instead the network choses to send a WUS at every epoch (for e.g. cell measurement purposes), then the detection mechanism may also provide for the detection of another orthogonal signal to the WUS preamble signifying that the UE may continue in its low power mode.

The performance results generated from the WUS design along with the detection mechanism are better than those for existing synchronization signals currently in use, i.e. a narrow-band primary synchronization sequence in terms of the number of OFDM symbols and repetitions used to satisfy MCL requirements at 154 dB and 164 dB resp.

The design of the wake-up signal may depend in part on the functions for the WUS as indicated above. The WUS (or a go-to-sleep signal) may be sent at some fixed duty cycle, namely the wake-up epoch and at a fixed time/frequency location within the desired bandwidth. In a first case, a 1-bit WUS may be used with the existing DL synchronization. The 1-bit WUS may be associated with the DTX mode, i.e., only sent when a paging or DL control channel message is to be present. In this case, a simple 1-bit WUS may be used that relies on existing DL synchronization, where the receiver already has a good timing and frequency offset estimation. Processing of the WUS may be limited to comparing the WUS with an existing hypothesis of the preamble. If correlation is achieved, the UE may perform control channel processing. If correlation is not achieved, the UE may go back to sleep.

In a second case, a 1-bit WUS may be used without the existing DL synchronization. The 1-bit WUS may be associated with the DTX mode, i.e., only sent when a paging or DL control channel message is to be present.

In a third case, a 1-bit WUS may be used without the existing DL synchronization. The 1-bit WUS may not be associated with the DTX mode. In these embodiments, the WUS may be sent regardless of when paging or a DL control channel message is present.

In a fourth case, a WUS may be used with a payload and without the existing DL synchronization. The WUS may not be associated with the DTX mode. In these embodiments, the WUS may be sent regardless of when paging or a DL control channel message is present along with an associated payload.

The second case assumes DL synchronization of the main receiver but not the WUR receiver. The WUS may thus consist of a single preamble. The WUR function may signal the main radio to complete a response to a paging request. No wake-up signal may be sent by the eNB during the WUS resource when there is no DL data for the UE or UEs within the WUS group. Detection of the presence of a WUS preamble within the WUR epoch window may be based on a comparison of the preamble detector output against a threshold. Estimation of the threshold may be one issue in the WUS design.

Figure 8:
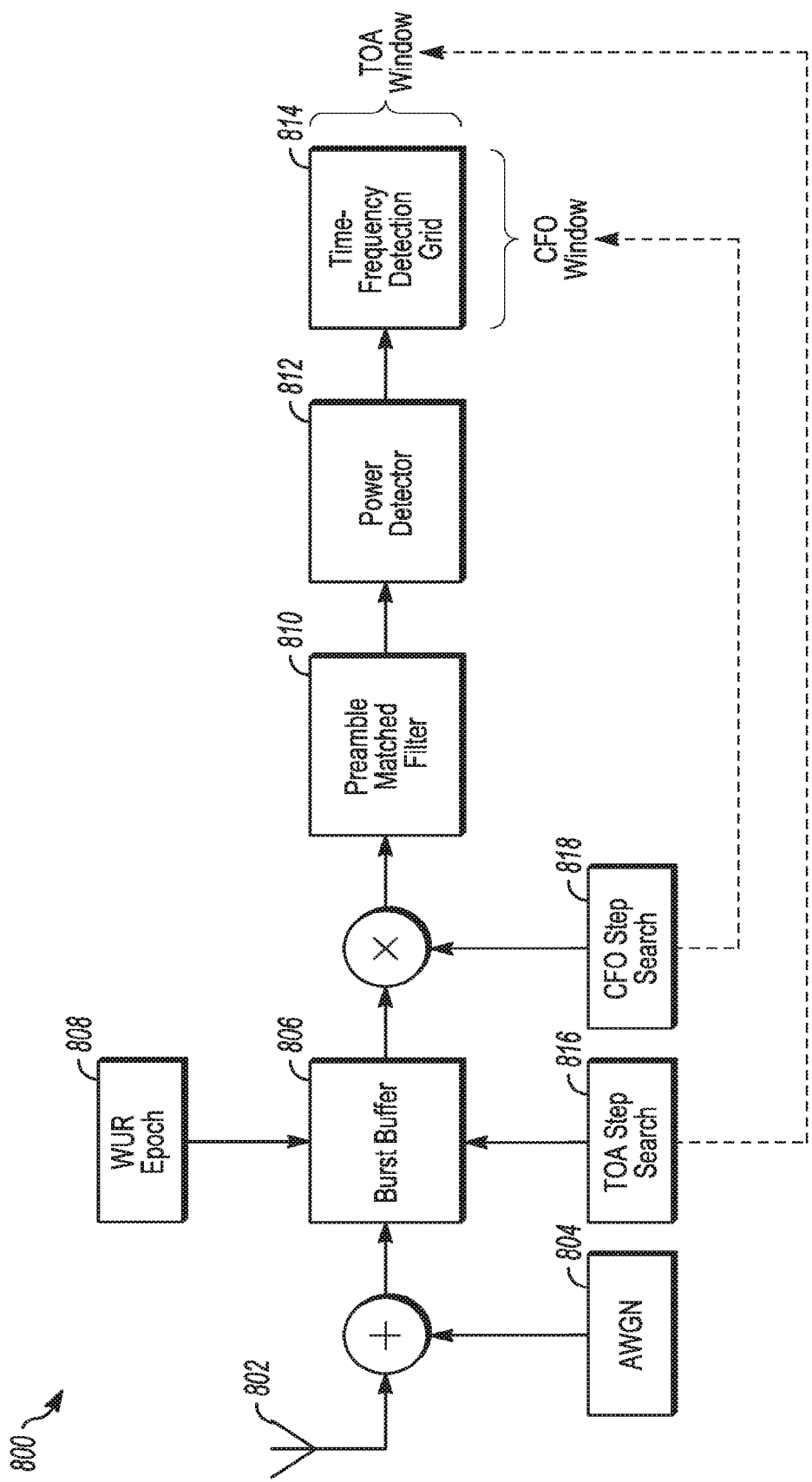
FIG. 8 illustrates a wake-up receiver (WUR) block diagram in accordance with some embodiments.

FIG. 8 illustrates a wake-up receiver (WUR) block diagram in accordance with some embodiments. The WUR may be part of the processing circuitry of the UE shown in FIGS. 1-6 or may be separate from the processing circuitry.

The antenna 802 may receive signals, which may be combined with Additive White Gaussian Noise (AWGN) 804 before being supplied to a burst buffer 806. The burst buffer 806 may be triggered using a WUR epoch trigger 808, which indicates the timing for the WUS. Prior to entering the sleep state, the WUR 800 may establish a timer block that generates a WUS search strobe to start the WUR epoch 808. When in the sleep state, the strobe may initiate the filling of the burst buffer 806 across the epoch interval. This may allow the WUR 800 to execute a time-frequency search across a two-dimensional window that spans the time of arrival (TOA) and carrier frequency offset (CFO) uncertainties.

The time-frequency search may be implemented by a preamble matched filter 808 that filters signals outside of the frequency band of interest (i.e. the frequency component of the RE), which is selected by the CFO stepper 818 at the particular time period indicated by the TOA stepper 816, a power detector 812 to measure the power at the RE. This arrangement may permit non-coherent detection of the WUS preamble to be performed at each TOA step-CFO step. The power sample so determined may be stored in the corresponding time-frequency detection grid location 814.

Figure 9:
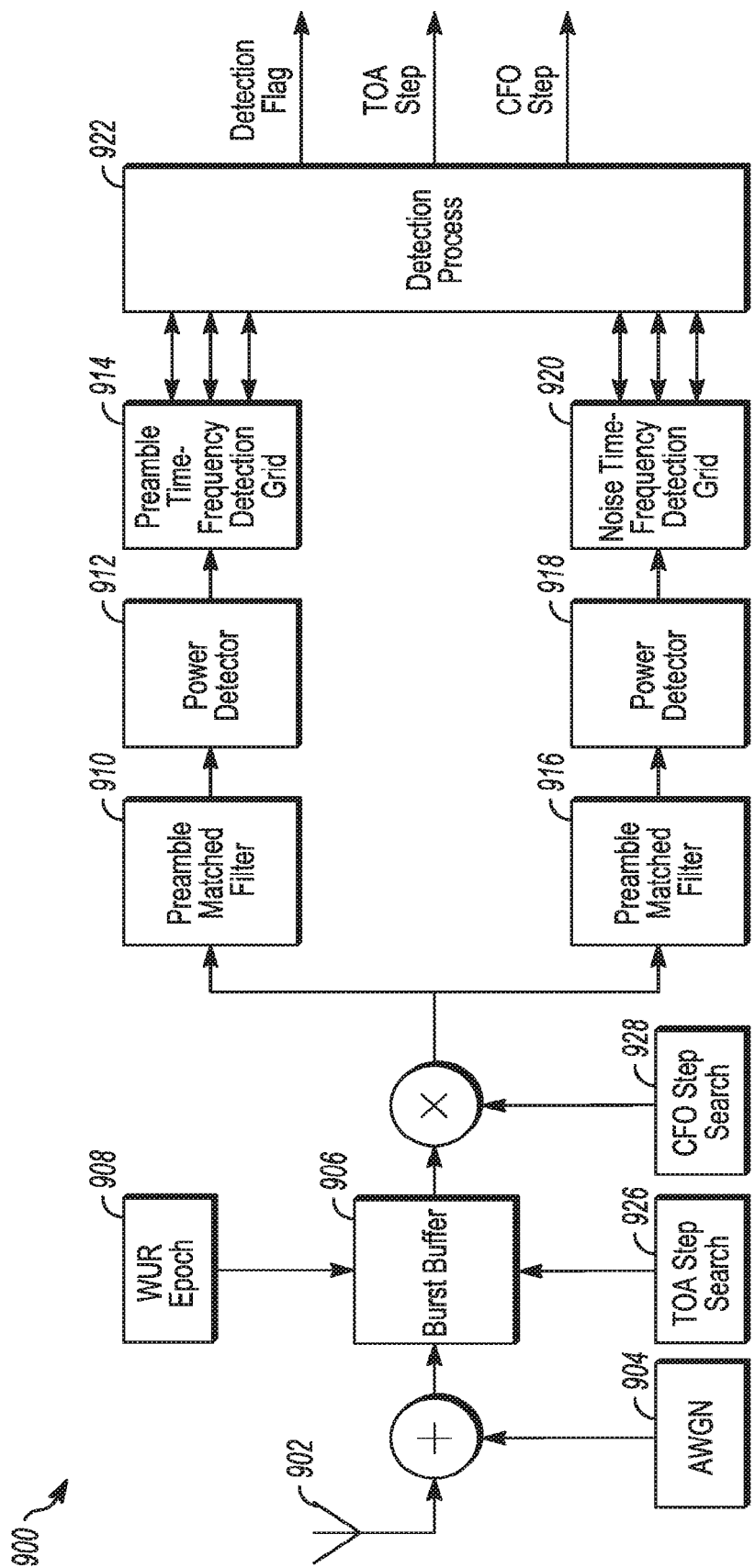
FIG. 9 illustrates a WUR block diagram in accordance with some embodiments.

The signal to come out of the sleep state may thus depend on detecting the presence of the WUS preamble, if sent. A present versus absent binary decision block may be used after the maximum power sample is found in the grid. This decision may be made relative to a decision threshold. These additional functions are shown in FIG. 9. FIG. 9 illustrates a WUR block diagram in accordance with some embodiments. The WUR may be part of the processing circuitry of the UE shown in FIGS. 1-6 or may be separate from the processing circuitry.

Thus, similar to FIG. 8, the antenna 902 may receive signals, which may be combined with Additive White Gaussian Noise (AWGN) 904 before being supplied to a burst buffer 906. The burst buffer 906 may be triggered using a WUR epoch trigger 908, which indicates the timing for the WUS. Prior to entering the sleep state, the WUR 900 may establish a timer block that generates a WUS search strobe to start the WUR epoch 909. When in the sleep state, the strobe may initiate the filling of the burst buffer 906 across the epoch interval. This may allow the WUR 900 to execute a time-frequency search across a two-dimensional window that spans the time of arrival (TOA) and carrier frequency offset (CFO) uncertainties.

The time-frequency search may be implemented by a preamble matched filter 908 that filters signals outside of the frequency band of interest (i.e. the frequency component of the RE), which is selected by the CFO stepper 918 at the particular time period indicated by the TOA stepper 916, a power detector 912 to measure the preamble power at the RE and store the power sample in the corresponding preamble time-frequency detection grid 914.

In FIG. 9, the output from the burst buffer 906 may be supplied to an additional branch. The branch may contain an orthogonal matched filter 916 to filter the signal and provide noise characteristics and another power detector 918 to measure the noise power at the RE and store the power sample in the corresponding noise time-frequency detection grid 920. The outputs from the preamble and noise grids 914, 920 are supplied to a detection process (or processor) 922 to determine whether the detection threshold is met. The output of the detection process 922 may thus include a detection flag to indicate whether or not the detection threshold has been met for the particular RE, as well as commands to the TOA and/or CFO steppers 916, 918 to change the RE.

Figure 10:
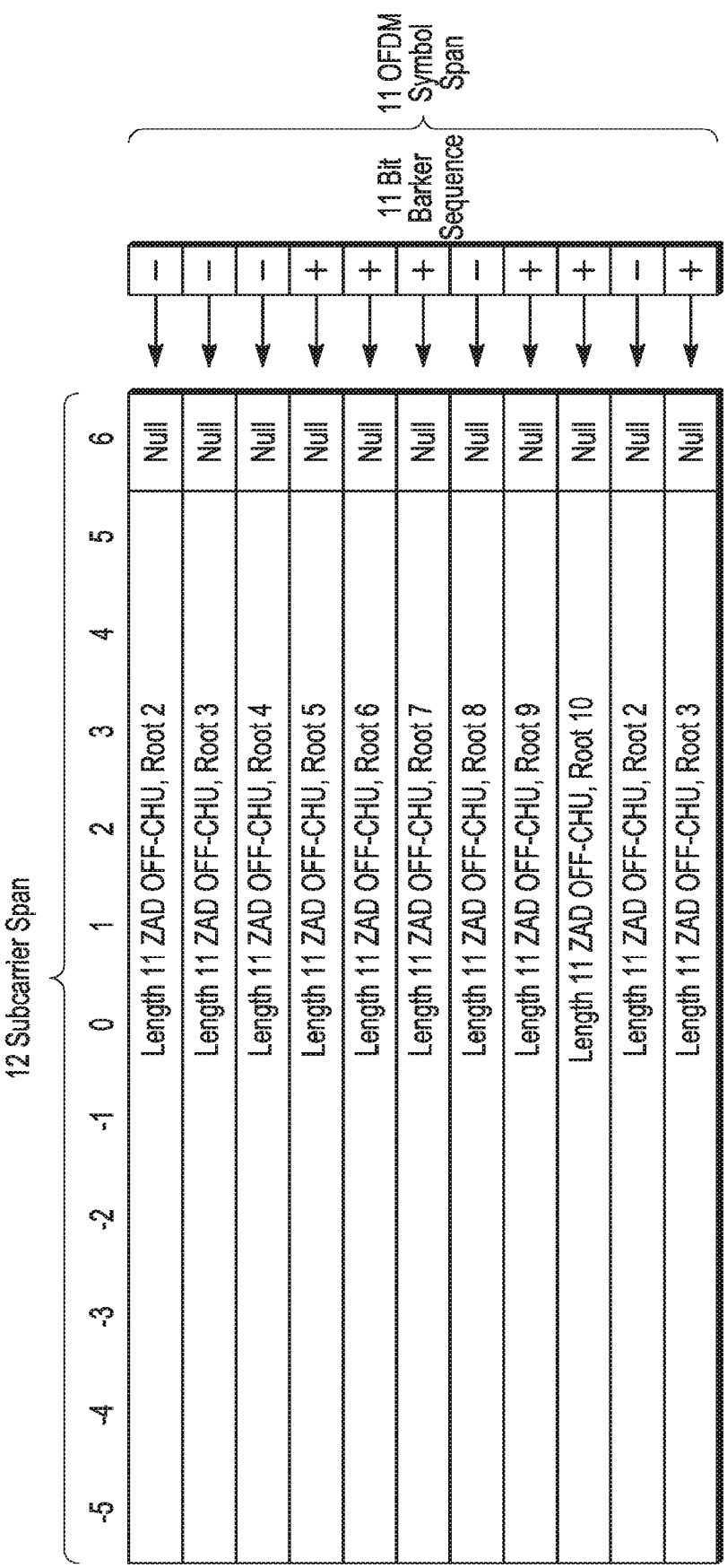
FIG. 10 illustrates a candidate wake-up signal (WUS) preamble in accordance with some embodiments.

FIG. 10 illustrates a candidate WUS preamble in accordance with some embodiments. The preamble may span 12 subcarriers and 11 OFDM symbols wherein a length 11 Zadoff-Chu sequence defines the frequency domain symbol phases across 11 of the 12 subcarriers in a single OFDM symbol. The twelfth subcarrier may have a zero-valued frequency domain symbol yielding a null at that subcarrier in the transmitted waveform. To fill out the preamble span across OFDM symbols, each successive OFDM symbol may be assigned the next successive root of the length 11 Zadoff-Chu sequence. There may be nine roots for this sequence (root 2 through root 10) and the sequential ordering is shown in FIG. 10. This ordering may be restarted at the tenth OFDM symbol using root 2 and root 3 to fill out the 11 OFDM symbols. A final step in the construction of the preamble may be to apply a cover code. For this, an 11-bit Barker sequence may be used by multiplying each frequency domain symbol in one OFDM symbol by the Barker sequence bit assigned to that OFDM symbol, as shown.

Figure 11:
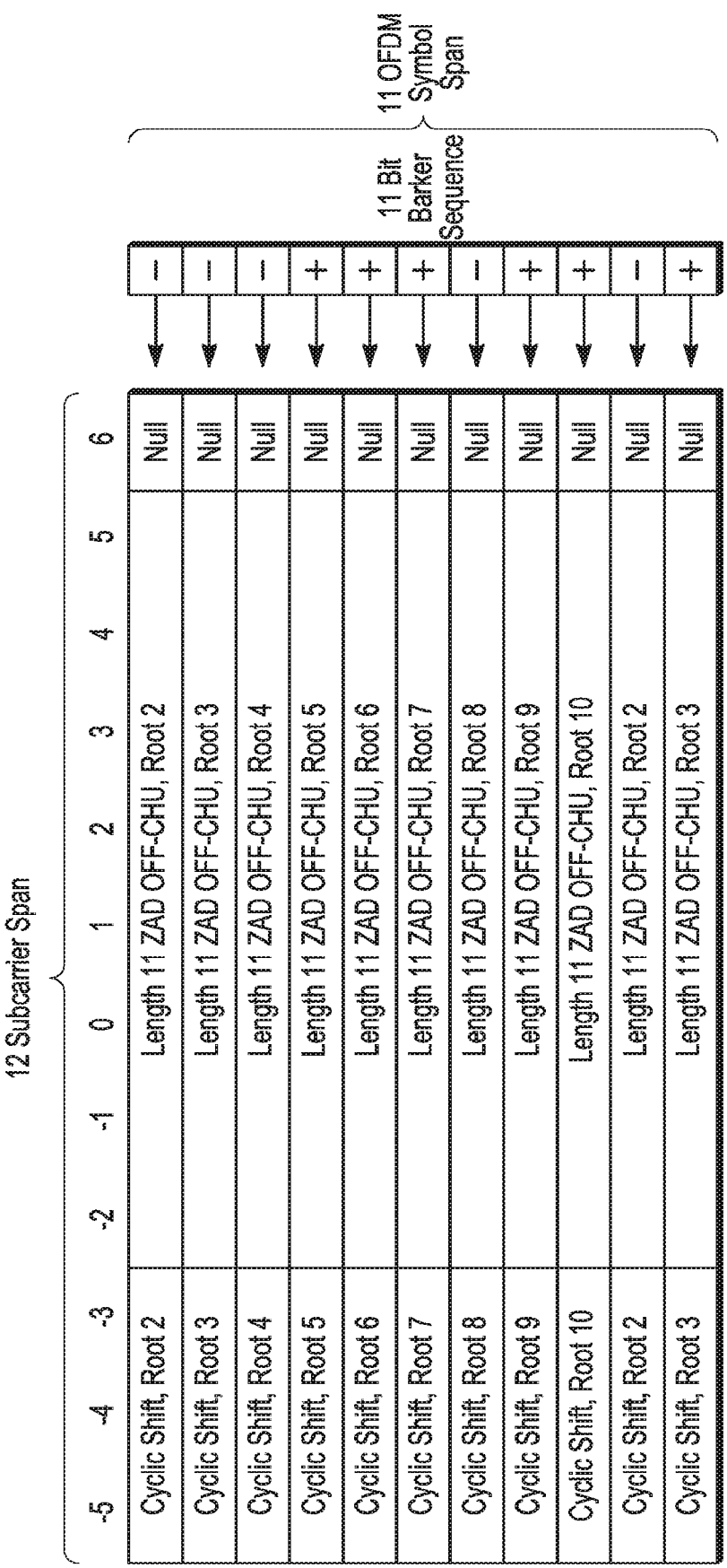
FIG. 11 illustrates a detection filter orthogonal to the candidate WUS preamble candidate in accordance with some embodiments.

FIG. 11 illustrates a detection filter orthogonal to the candidate WUS preamble candidate in accordance with some embodiments. To construct the orthogonal matched filter, an identical construction as the WUS may be used. However, the sequence orientation of the orthogonal matched filter may be changed to create a matched filter that is orthogonal. This construction may provide an orthogonal matched filter only at the on-time on-frequency condition (zero timing and frequency error), and may be created by circular shifts of the Zadoff-Chu sequences across the subcarriers within each OFDM symbol.

In some embodiments, a "correct detection" of the WUS preamble may be declared using a stringent criterion that the maximum power over all of the bins in both the preamble time-frequency detection grid and the noise time-frequency detection grid must be located in the preamble time-frequency detection grid at the on-time and on-frequency bin. This may mean that the timing estimation provided by correct detection should be good enough to provide fine timing/frequency synchronization and is actually better than the criterion used if taking a particular type of cyclic prefix into account.

A Monte-Carlo analysis of the system with the preamble matched filter and the noise matched filter was performed. Given the relatively narrow bandwidth of a preamble spanning 11 contiguous subcarriers in relation to the much wider coherence bandwidth of the ETU channel model, the WUR detection process experiences a flat fading environment. Also, the Doppler spread of this model is 1 Hz, so the WUR detection process executes over a static channel. Thus, the average detection error performance can be found by calculating the mean of the detection error probability over the flat fading channel statistics.

Since the Rayleigh fading probability is parameterized by the mean power, the average detection error probability can be determined as a function of that mean power. For the purpose of this analysis the target average detection probability of 1% is used, corresponding to an average detector output SNR of about 28 dB. From the link budget table, the available SNR at the input to the WUS Rx detector is 0.4 dB. Incorporating fading characteristics, to detect the WUS with 1% missed detection probability using the matched filter and detection algorithm described above, an output SNR of ~28 dB should be used. Thus, a gap of about ~27.5 dB may be present. From the aforementioned assumption that the AWGN link budget at a MCL of 144 dB yields an SNR of 0.4 dB, the mean detector output of the matched filter over 11 subcarriers and 11 symbols with a channel model narrowband gain of 8.1 dB is 29.3 dB. This indicates that the candidate preamble meets the average detector output power requirement with about 1 dB margin.

Reflecting on the possible decision outcomes from the WUR processing, the binary state of the detection flag indicates either the WUS preamble is present within the time-frequency grid or the WUS is absent. If the maximum power over all bins in both grids is from the preamble time-frequency detection grid then the corresponding bin location defined by the TOA step and CFO step may be used to access the power sample at the same location in the noise time-frequency detection grid. This noise sample may be used to derive the decision threshold by specifying the constant false alarm probability. Assuming the noise power sample is central $\chi^2$ distributed and the preamble power sample is non-central $\chi^2$ distributed then a threshold set at a constant false alarm probability of 2% would produce a missed detection probability of 1% in a flat fading channel with a mean SNR of 26.9 dB, which provides a margin in excess of a dB.

Extending this discussion to MCL values of 154 and 164 dB may be a matter of increasing the performance margins by 10 and 20 dB, respectively. The simple approach would be to increase the length of the WUS preamble to accommodate the maximum 20 dB margin by assuming coherent detection across the full preamble structure. A 100-fold increase in the basic structure may result in a WUS preamble that still spans 11 subcarriers, but now spans 1100 OFDM symbols. In duration, this extended version would be about 100 milliseconds long. An argument could be made that a channel with a Doppler spread of 1 Hz should remain essentially constant over 100 milliseconds so the foregoing analysis still holds. However, the ramifications to the grid size may be significant.

The shape of the main lobe of the detector response within the grid may be a function of both the number of subcarriers spanned and the number of OFDM symbols spanned. The number of TOA steps in the grid may be the ratio of the TOA span divided by the sampling period, and the sampling period is inversely proportional to the bandwidth. Since the number of subcarriers may remain the same for the extended preamble, the number of TOA steps may also remain the same. In like manner, the number of CFO steps in the grid may be inversely proportional to the number of OFDM symbols spanned by the preamble. Thus, a 100-fold increase due to the extension of the basic preamble structure may incur a 100-fold increase in the CFO step resolution. For illustration, the data obtained used a grid size of 56 TOA steps by 113 CFO steps spanning a 0 to 2 symbol TOA uncertainty by ±2 subcarrier CFO uncertainty. Those equate to a time sample resolution of about 3 microseconds and a frequency resolution of about 530 Hz. The extended values would be the same sample resolution, but a finer frequency resolution of about 5 Hz. Thus, a resolution of 5 Hz steps at the carrier frequency of 960 MHz does not seem unreasonable.

For the basic structure, the 56 by 113 grid contains 6328 power samples. One should expect some detection performance degradation when extending this by a factor of 100, but a short study of grid size variation by way of the Monte-Carlo simulation and a separate analysis using the largest extreme value (LEV) asymptotic distribution strongly suggest that the shape of the performance curve remains essentially unchanged over various grid sizes given that they are all large numbers of samples.

Turning now to the use of a 1-bit WUS and no DTX, assuming no prior DL synchronization, either a wake-up signal or a go-to-sleep signal may always be sent during the WUS epoch. This is useful for synchronization and estimation purposes. The WUS detection may in some embodiments be used by the UE to remain synchronized to the channel and use the WUS as an estimation mechanism. The UE may then account for the case if the estimation is incorrect (i.e., a WUS is sent, but a Go-to-sleep signal is detected instead and used for further estimation). A weighted estimation technique may be used to smooth out errors.

This scenario assumes that a WUS preamble is always sent at the WUR epoch. Two preambles may be used to signal either "Wake up" or "Go to sleep." The two preambles used for this case may be Preamble W for "Wake up" and Preamble S for "Go to sleep." The preamble structures depicted in FIGS. 10 and 11 may suffice for these two preambles as they are orthogonal. This means that the WUR shown in FIG. 9 can be reused with the slight 1o modification that the preamble and orthogonal matched filters 910, 916 may be replaced by preamble W and preamble S matched filters and the preamble and noise time-frequency detection grid 914, 920 may be replaced by a preamble W and preamble S time-frequency detection grid.

Figure 12:
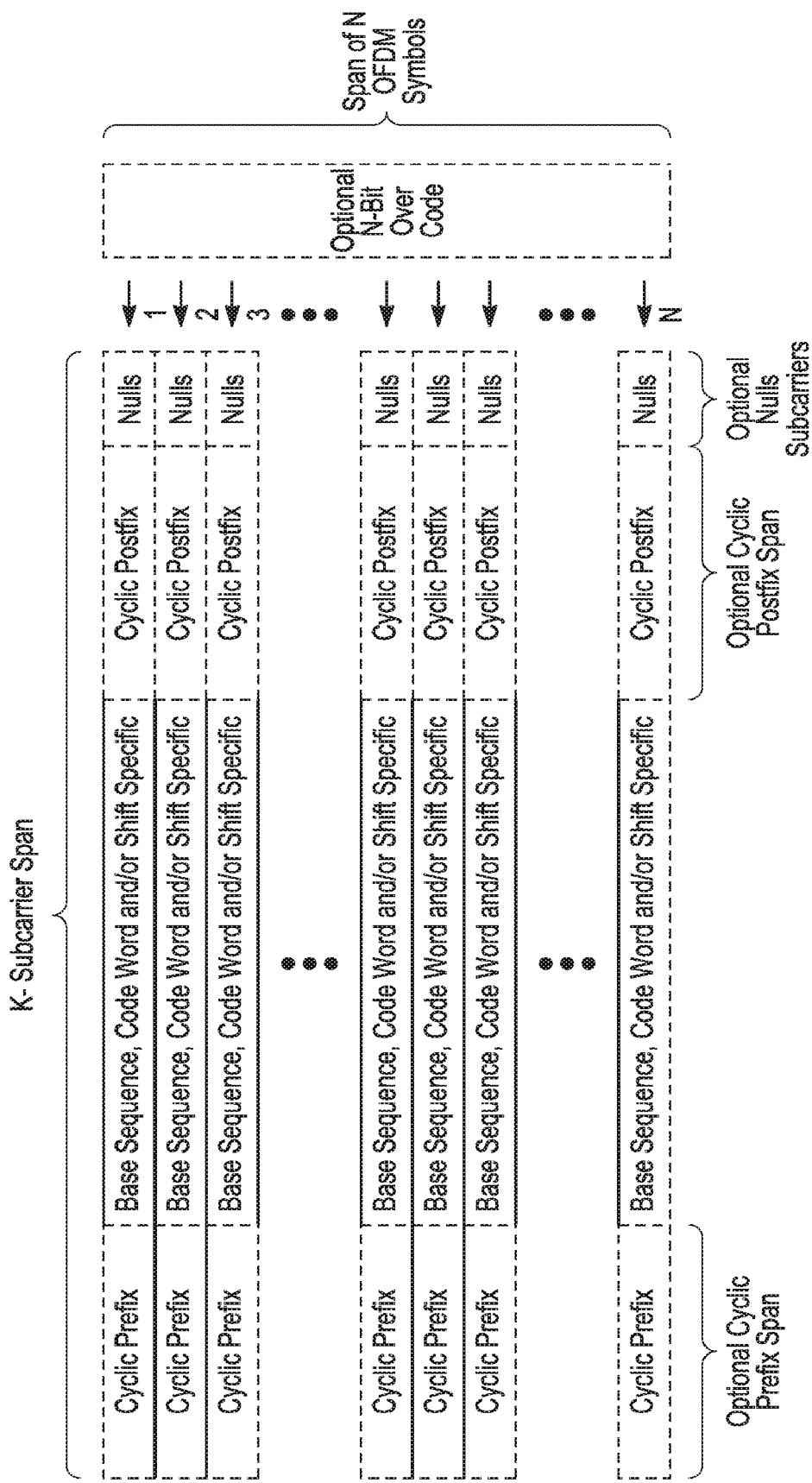
FIG. 12 illustrates a generic WUS preamble structure in accordance with some embodiments.

FIG. 12 illustrates a generic WUS preamble structure in accordance with some embodiments. In the generic preamble structure, K=12 and N=11 for a feNB-IoT case. In this embodiment, the preamble structure can contain cyclic prefixes and postfixes to provide additional correlation to compensate for the carrier frequency offset of up to +/−1.3 subcarriers width with a shorter ZC sequence of length 7 or 8 instead and a cover code added for additional performance.

The design of the wake-up signal for efeMTC and other technologies that use the same bandwidth as that specified by LTE, namely 1.4 MHz onwards until 20 MHz, may differ from the signal design for NB-IoT type technologies, which is currently deployed over 180 kHz bandwidth. The wake-up signal preamble and detection specific to efeMTC UEs is described below. The efeMTC WUS may use 6 contiguous resource blocks spanning 72 sub-carriers (72*15 kHz=1.08

MHz) of occupied bandwidth that can be potentially utilized for the WUS. As above, the WUS may be sent at the wake-up epoch and at a fixed time/frequency location within the efeMTC/feMTC bandwidth.

Figure 13:
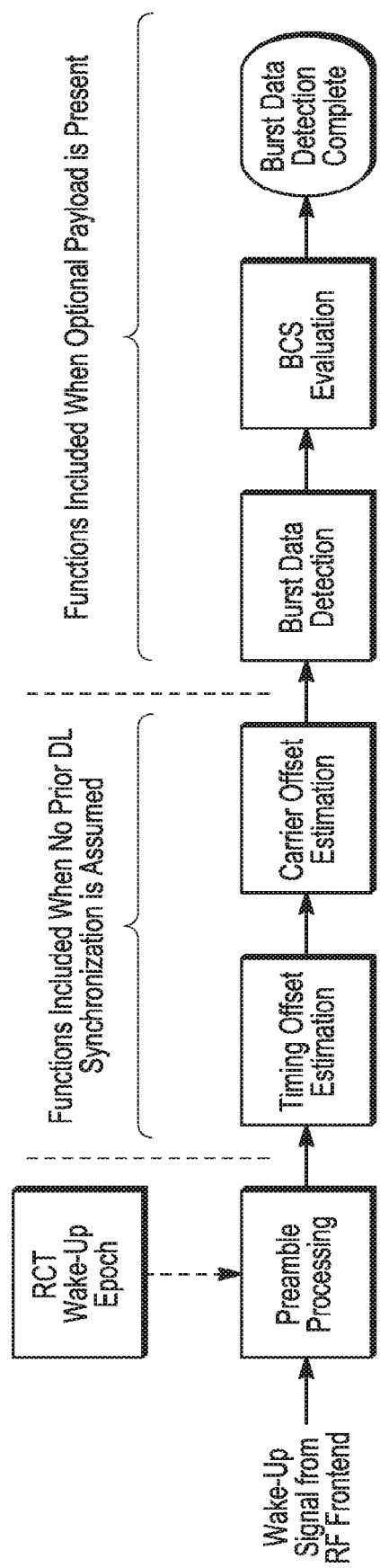
FIG. 13 illustrates a WUS reception process flow in accordance with some embodiments.

FIG. 13 illustrates a WUS reception process flow in accordance with some embodiments. The process may be elaborated in view of the description in FIGS. 8-12. As elsewhere herein, all signals sent may be encoded by the transmitting entity prior to transmission and subsequently decoded by the receiving entity. As shown in FIG. 13, the WUS processing at the Rx side may entail waking up to scan for the WUS preamble at the WUS epoch. The efeMTC UE may then detect and decode the signal so as to deliver performance at a predetermined missed detection probability and a false alarm probability, such as a missed detection probability of 1% and a false alarm probability of 2%. The WUS must also satisfy constraints such that it can be received at different MCL targets, for example of 144 dB, 154 dB and 164 dB. To meet these targets, the WUS signal may be repeated several times as the coverage targets increase.

The functions shown in FIG. 13 include functions when DL synchronization is not assumed (cases 3 and 4 above)—in which the timing and carrier offset may be estimated, and functions when a payload is present. The latter may include detection of the burst data and evaluation of the BCS when carrier aggregation is used. Thus, for case 1 (1-bit WUS with DTX, that relies on existing DL synchronization), the WUS may merely be processed and compared with an existing hypothesis of the preamble. If correlation is achieved, the efeMTC UE may then go on to perform control channel processing. If correlation is not achieved, the efeMTC UE may go back to sleep. For case 2 (1-bit WUS with DTX, not using DL synchronization), the WUS may be detectable in the absence of the fine time/frequency synchronization. Thus, case 2 may have a greater uncertainty regarding the time and frequency offset estimation and a threshold-based detection may be used to establish presence/absence. For case 3 (1-bit WUS without DTX, not using DL synchronization), the WUS preambles may comprise 2 different signals such that they are orthogonal to each other, one to indicate that the WUS indicates presence of Paging or Control channel information and the other to indicate the absence of this information. In this case, the signals may also potentially provide synchronization and use a max-differential threshold-based detection scheme. For case 3 (WUS without DTX, with payload), the WUS preamble may satisfy similar constraints as in case 2, but may always be present and thus use a maximum-correlation based detection scheme. The preamble may be used to perform fine time/frequency offset estimation such that the UE is able to then demodulate the following payload attached to the WUS, which provides additional information regarding the WLUS (for e.g. the UE group or cell to which the WUS belongs).

Currently, efeMTC UEs may be limited to a 1.4 MHz LTE system bandwidth with the first 3 symbols of each sub-frame reserved for the LTE PDCCH and the remainder of the symbols within the subframe potentially available for sending efeMTC-related information. This thus leaves 11 symbols remaining for sending the WUS within a given subframe over 6 contiguous PRBs (i.e., 72 sub-carriers) for the WUS as shown in FIG. 12, where L=72 and N=11.

As above, the WUS may include a preamble with good auto-correlation properties such as a constant-amplitude Zadoff-Chu sequence with different roots or even multiple roots and different lengths. The sequence may be designed so as to have low cross-correlation with the existing synchronization signals such as NPSS/NSSS, PSS/SSS or DMRS signals within the LTE cell.

Various optimizations to existing sequences such as PSS/SSS/NPSS/NSSS may be used for faster detection. These optimizations may include the addition of a cyclic prefix and/or postfix to overcome the high uncertainty on the carrier frequency offset (+/−0.05 ppm/s for feMTC). In addition, cyclic shifts in the time domain or frequency domain can be introduced to make the WUS cell-specific, UE-group specific or to differentiate a wake-up or go-to-sleep indication. The cyclic shifts may be used only with prior DL synchronization-without prior DL synchronization, the cyclic shifts may introduce a time ambiguity in the timing estimation.

As above, a cover code can further be applied. The cover code may be applied at the sample-level, symbol-level, or symbol-group level. For example, the cover code can be [1, 1, 1, 1, −1, −1, 1, 1, 1, −1, 1] applied to 11 symbols as in NB-IoT, or can be any other sequences with good cross-correlation property, e.g. length-M Barker codes or ZC sequence where M can be any integer smaller than the transmitted WUS symbols such as 11.

When there are CRS REs in the symbols with the WUS, the CRS may be punctured. Alternatively, the WUS in the CRS REs may be punctured. The WUS can be transmitted in central 6 PRBs. or in the NB—i.e., where the MPDCCH is monitored. The WUS may also use frequency hopping: the WUS may be repeated across different NB allocations of 1.4 MHz within the LTE system band width in a predetermined pattern known to the UE before the UE enters the idle state or the connected DRX state. The use of frequency hopping to send the signal may help in recovering the signal faster, particularly for UEs in extended coverage areas. In one example, the frequency hopping configuration can be the same as the frequency hopping configuration for paging.

For an available allocation period of 72 sub-carriers over 11 OFDM symbols, WUS preambles may be constructed in various ways. The WUS preamble may have a single length N1 ZC-sequence coherently detected across all N1 subcarriers, e.g. N1=72, 62 or 63. This may also be constructed as a variation on the existing length-62 or length-63 ZC sequence used with different roots as currently used for LTE PSS/SSS. The WUS preamble may have two length N2 ZC-sequences, each coherently combined over N2 subcarriers and the two detector outputs non-coherently combined, e.g. N2=36. The WUS preamble may have three length N3 ZC-sequences, each coherently combined over N3 subcarriers and the three detector outputs non-coherently combined. e.g. N3=24. The WUS preamble may have six length 12 ZC-sequences, each coherently combined over 12 subcarriers and the six detector outputs non-coherently combined.

For the above options, different root indexes can be used to reduce inter-cell interference, or be used to indicate different UE groups, or to indicate the "wake-up" or "go-to-sleep" information. In examples with a length-63 ZC sequence, the root indexes can be any values from {1, 2, . . . , 63} excluding {25, 29, 34} which have been used for LTE PSS. For example, root indexes of {40, 44, 59} can be used for cells with PCID mod 3={0, 1, 2}, respectively, or be used for indication of three UE groups. As another example, root indexes of {9, 21, 24, 40, 44, 59} can be used for 3 sets of {wake-up, go-to-sleep}, e.g., {9, 40}, {44, 24} and {21, 59} with the first root index of each set indicating "wake-up" and second root index of each set indicating "go-to-sleep" or vice versa, where the 3 sets can correspond to 3 cells or 3 UE groups. The table below shows the cross-correlation of the length-63 ZC sequence with these root indexes.

| Length-63 ZC sequence cross-correlation | | | | | | | | |
|---|---|---|---|---|---|---|---|---|
| Root index | 9 | 21 | 24 | 25 | 29 | 34 | 40 | 44 | 59 |
| 9 | 1.00 | 0.26 | 0.22 | 0.18 | 0.16 | 0.16 | 0.15 | 0.33 | 0.16 |
| 21 | 0.26 | 1.00 | 0.23 | 0.16 | 0.16 | 0.15 | 0.15 | 0.16 | 0.16 |
| 24 | 0.22 | 0.23 | 1.00 | 0.15 | 0.16 | 0.16 | 0.17 | 0.16 | 0.33 |
| 25 | 0.18 | 0.16 | 0.15 | 1.00 | 0.20 | 0.38 | 0.22 | 0.16 | 0.22 |
| 29 | 0.16 | 0.16 | 0.16 | 0.20 | 1.00 | 0.17 | 0.20 | 0.23 | 0.22 |
| 34 | 0.16 | 0.15 | 0.16 | 0.38 | 0.17 | 1.00 | 0.22 | 0.19 | 0.17 |
| 40 | 0.15 | 0.15 | 0.17 | 0.22 | 0.20 | 0.22 | 1.00 | 0.20 | 0.17 |
| 44 | 0.33 | 0.16 | 0.16 | 0.16 | 0.23 | 0.19 | 0.20 | 1.00 | 0.22 |
| 59 | 0.16 | 0.16 | 0.33 | 0.22 | 0.22 | 0.17 | 0.17 | 0.22 | 1.00 |

Figure 14A:
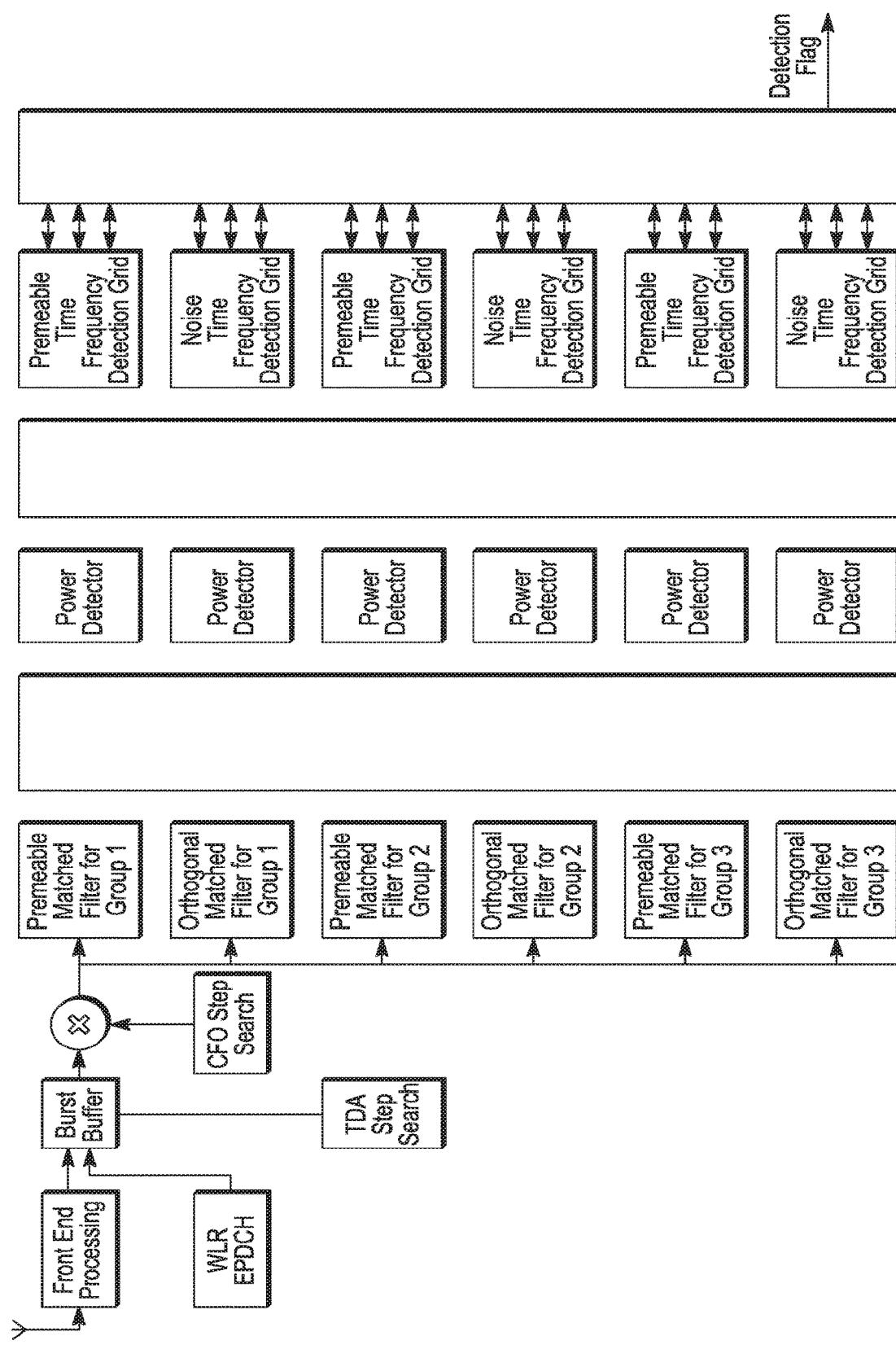
FIGS. 14A-B illustrate a WUR block diagram in accordance with some embodiments.
Figure 14B:
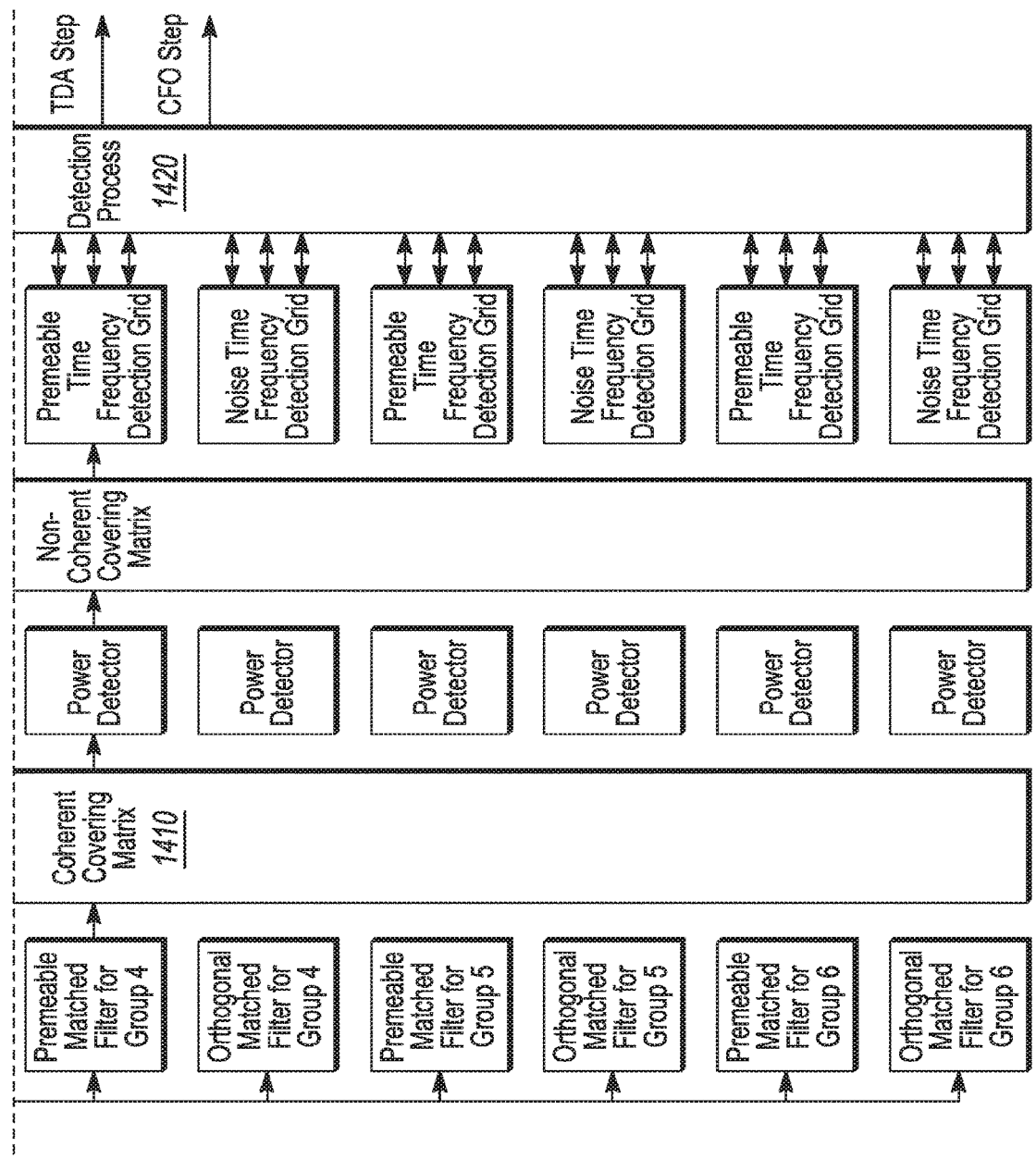

As above, to utilize the full bandwidth of the efeMTC, 72 subcarriers, a total of six groups of 12 contiguous subcarriers each may be defined. Each group may contain one of the basic structures described in relation to FIG. 10, which occupies 12 contiguous subcarriers and spans 11 OFDM symbols. FIG. 14 illustrates a WUR block diagram in accordance with some embodiments. The basic blocks of the WUR shown in FIG. 14 have been described in relation to FIGS. 8 and 9, and so are omitted here for brevity. The TOA and CFO step search blocks may yield matched filter output samples for each coordinate pair in the time-frequency grid. In this embodiment, the minimum coherence bandwidth supported is that over which the basic preamble can be detected using a matched filter. Addressing the nature of the sequential groups (2 through 6), the matched filter construction for those are identical to that for Group 1 except the frequency is offset by multiples of 12 subcarriers to span the full allocation of 72 subcarriers.

The outputs of the matched filters may be processed by the coherent combining matrix 1410. The coherent combining matrix 1410 may configure the detection bandwidth to accommodate the coherence bandwidth of the channel. The combinations that can be generated in the matrix may include: highly frequency-selective channels in which no coherent combining of the matched filter output is used (all 6 are passed to the power detectors); moderate frequency-selective channels in which frequency-adjacent pairs of groups (1-2,3-4,5-6) have matched filter outputs added coherently and the resulting 3 sets are passed to the power detectors; mild frequency-selective channels in which frequency-adjacent triplets of groups (1-3,4-6) have matched filter outputs added coherently and the resulting 2 sets are passed to the power detectors; and frequency-nonselective channels in which all groups have matched filter outputs added coherently and the resulting single output is passed to the power detector.

The power detector outputs may then be passed to a non-coherent combining matrix 1420 for final processing. The coherent combining matrix 1410 may provide various options for completing the detection process. One option is to non-coherently combine all of the inputs to yield a single detector sample per time-frequency grid location. In this option the detection process may determine the detection flag based on the maximum power value in the grid. Another option may be to store each of the inputs as a sample in separate and corresponding time-frequency grid locations. In this option the detection process may determine the detection flag based on a comparative operation on the multiple grids such as a majority logic decision.

In addition to selecting one or more search locations in the aforedescribed process and reporting that location in the format of the TOA and CFO step, a minimum detected power threshold may be desirable to assess the quality of the received preamble in terms of power levels. As above, this capability may be provisioned by the inclusion of the orthogonal matched filters.

Using the oracle method. Monte Carlo simulations were run to determine false alarm threshold by using Noise as input. The results show that the false alarm threshold is found to be different for different numbers of OFDM symbols combined in the preamble. For example, if the preamble is combined over 3 OFDM symbols vs. 6 OFDM symbols, the combining gain is not as high as one would expect (<3 dB) and thus the false alarm threshold rises as more symbols are combined. Partial correlation may be used between the received signals and the local 6 ZC sequences. Depending on the frequency offset, the long sequence is divided into N pieces (e.g. using N=2 for each symbol with frequency offset of /−5 ppm (i.e. 4.5 kHz). There is a tradeoff between the correlation performance and the impact of frequency offset, when selecting the value of N. If the largest peak among correlation of 6 sequences is compared to the false alarm threshold and the peak is larger than the threshold, the detected sequence is indicated and the location of the peak is the starting time. If the timing estimation error falls within the cyclic prefix interval, then the preamble signal may also be used for synchronization purposes to demodulate the payload (if the payload exists).

In some embodiments, a new WUS payload format may be defined. The WUS payload may immediately follow the sequence. The payload may not follow the modulation/coding format schemes of either the PDCCH or PDSCH so as to reduce the decoding costs on a low-power receiver. Examples of the other modulation/coding schemes may include Differential Binary Phase Shift Keying (DBPSK), Differential Phase Shift Keying (DPSK) or Frequency Shift Keying (FSK). These schemes may enable non-coherent detection to reduce processing costs and thus power consumption costs of the receiver. The payload may convey the following information: the specific UE ID of the UE to be woken up (which may be the System Architecture Evolution (SAE)-Temporary Mobile Subscriber Identity (S-TMSI) as in the paging record or a new shorter WU-specific ID) or an ID specifying a group of UEs, an ID specifying the Physical Cell ID of the current eNB and a burst check sequence.

The use of the WUS can be based on UE capability. Moreover, the use of the WUS can be RRC configured, and the configuration can be cell-specific via SIB signaling to inform the UEs in the cell that the WUS is supported in the cell. In some embodiments, the configuration of the WUS can be tracking area (TA) specific (in case the WUS is used as an alternative to paging), e.g. broadcast via SIB with the list of tracking areas where the WUS is supported. This may be especially useful if the UE is an eMTC UE and thus somewhat mobile.

In some embodiments, the WUS may be repeated. In this case, the eNB may configure, in a cell-specific manner, the maximum number of repetitions to be used for WUS. In one embodiment, the WUS configuration may be based on the coverage condition of the UE. In this case, the eNB may determine the coverage level of the UE (e.g., EC mode A or mode B). The coverage level may be provided by the UE in higher layer signaling, for example.

The eNB or MME may assume the coverage status does not change for certain duration, e.g. for idle mode paging. The eNB may assume the coverage status is the same as the status of the UE before entering the RRC_IDLE state. In one embodiment, the coverage status remains the same unless the eNB is informed via a tracking area update message that the UE has moved out of the tracking area and entered a different cell or a tracking area that does not support a WUS and thus cannot be woken up via a WUS and must fall back to paging instead.

In some embodiments, the WUS may be monitored for based on a WUS timer. The WUS timer may start counting down when the UE enters the RRC_IDLE state. The wake-up mechanism may be used for a UE if the UE is in good coverage before the UE enters the RRC_IDLE state and the timer does not expire. Otherwise, the legacy paging mechanism may be used. The WUS timer may depend on the mobility behavior of the UE.

If the WUS configuration is based on the UE coverage, the WUS may not replace the paging mechanism. In this case, the eNB may signal both a legacy paging and a wake-up signal (with or without paging) for UEs in a grey area, where the eNB does not have a clear knowledge about the coverage of the UE. The UE may monitor either the paging signal or the WUS based on an evaluation of the UE coverage. The UE coverage can be based on the DL Reference Signal Received Power (RSRP). For example, if the DL RSRP is lower than a predetermined threshold, the UE may fall back to use of the legacy paging mechanism. The DL RSRP may be estimated based on a CRS/NRS or may be based on the WUS sequence.

In some embodiments, signaling between the UE and the eNB/MME may be used. In particular the UE may signal to the eNB/MME whether or not the UE uses a WUS.

As above, the WUS may be transmitted using time domain and frequency domain resources that are allocated by the eNB. For the time domain resource, in one embodiment, the WUS can be transmitted immediately before or at a fixed offset from the on-duration of the cDRX and paging occasions. Specifically, assuming DL synchronization is maintained, the starting subframe of the WUS can be a function of the REs configured for the WUS with respect to the start of the paging occasion in idle mode, and with respect to the start of active time in the cDRX state. The offset can be determined differently if the WUS is being sent during cDRX vs. paging since the UE may use more time to be able to monitor the PDCCH when starting from receiving a WUS during the idle state vs. receiving the WUS during the cDRX state.

The WUS may span multiple PRBs within the same frequency band in succession to facilitate low-power reception of the WUS. In such cases, the WUS may avoid overlapping with other control channels that use the same frequency band such as the PDCCH (for in-band cases). NPSS/NSSS etc.

In another embodiment, the WUS can be transmitted periodically, independent of the POs or C-DRX On-duration periods. In this case, the periodicity can be predefined or configured by the eNB.

The effect of transmitting the WUS with respect to the paging occasions may be that all UEs monitoring the PO are woken up to monitor for the (M/N)PDCCH. This may be the case, if the WUS sequence is common to all the UEs configured with the same PO and the payload (if exists) does not carry UE-specific or UE group-specific information, which may further differentiate the UEs from the set of UEs configured with the same PO. On the other hand, if different WUS sequences are configured to different UEs monitoring the same PO or the WUS payload (if present) carries UE-specific information or UE group information which are different for UEs monitoring the same PO, e.g. a subset of UEs or each UE corresponds to different WUS, only a subset of UEs (down to a single UE) may be woken up to monitor the (M/N)PDCCH.

If the WUS replaces paging, the WUS may be transmitted at time instances determined to be similar to the POs, but with only a single UE monitoring each PO. In this case, the WUS may be designed such that any overlap of the repetitions from one PO for a first UE crossing another PO (for a second UE) is not falsely detected by the second UE as a positive paging. For instance, PF/PO-specific scrambling (for payload) or CS/root indexes (for sequence) etc. may be defined as well.

For the frequency domain resource, in one embodiment, the WUS may be transmitted in one or more PRB(s). The PRB(s) may be predefined or may be configured by the eNB. In another embodiment, the WUS can be transmitted in the PRB/NB for paging monitoring. In one example, this embodiment may only be used for idle mode. In cDRX, the NB-IoT carrier or narrowband can correspond to the carrier/narrowband monitored by the UE for (M/N)PDCCH monitoring in the connected state.

For efeMTC UEs, the frequency domain resource allocation may be based on the above methods if only 1 PRB or a subset of PRBs within the NB are used for the WUS. Thus, the PRB(s) can as above be predefined or configured. In one example, the PRB(s) can be the first (or last) PRB(s) within the NB for paging monitoring in the idle mode or for MPDCCH monitoring in the cDRX state.

Figure 15:
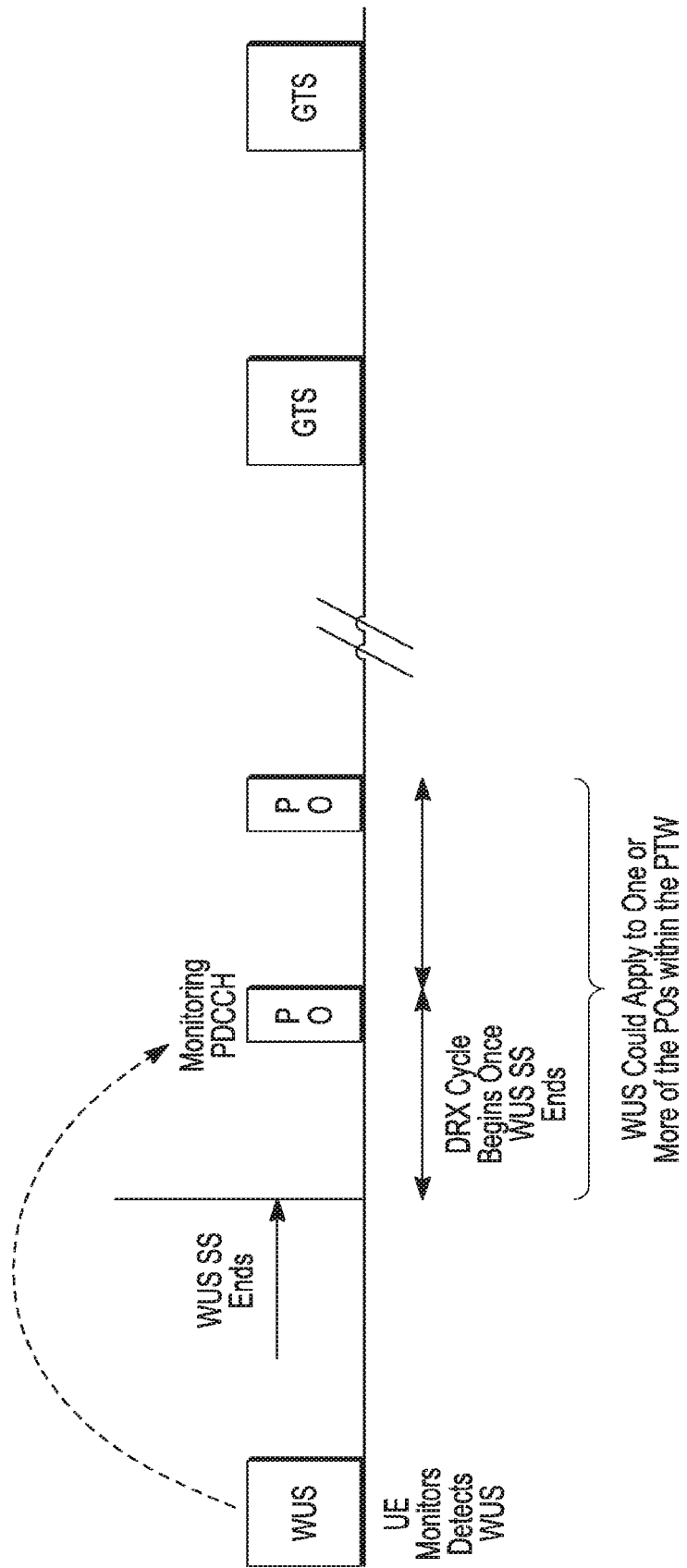
FIG. 15 illustrates a sequence of events after a WUS is detected in accordance with some embodiments.

FIG. 15 illustrates a sequence of events after a WUS is detected in accordance with some embodiments. Once the UE detects the WUS, the UE may determine in which PO to receive the paging message. This may be complicated as the WUS may be repeated many times, e.g. for UEs in enhanced coverage mode, to ensure that the UE actually receives the WUS. Given that the UE's coverage mode during the idle state may not be known for NB-IoT UEs, and may be estimated for CAT-M1 UEs based on the coverage mode indicated in the S1-AP message sent by the eNB to the UE, the eNB thus may repeat the signal at least until the UE's last known coverage level. This may involve sending the WUS a number of times, however the UE may actually detect the WUS sooner than when the WUS search space ends.

To alleviate this issue, once the WUS is detected by the UE, the UE may monitor the PO immediately following the end of the WUS search space. The WUS SS may be configured by the eNBs for various coverage levels. When the eNB is unaware of the UE's coverage level during the idle mode, the WUS SS may be set to the maximum repetition value for the coverage level offered by the given cell. Once the WUS SS ends, the UE may start a Paging Time Window (PTW), during which the UE may monitor the POs as defined for the PTW.

The number of DRX cycles in this PTW following the WUS may be defined by the eNB either using RRC signaling or through cell-specific parameters. These parameters may include the length of the wake-up Paging Time Window (wPTW) and the wake-up DRX cycles. The length of the wPTW for POs indicated by WUS may be anywhere from 1-n DRX cycles, where n is the maximum number of DRX cycles within the wPTW and the Paging message may be received during any one of these DRX cycles within the PTW window. This may allow the eNB some scheduling flexibility to schedule the Paging message with a corresponding slight increase in power consumption at the UE end to actually receive the Paging message. The wake-up DRX cycles may be, for example, 80 ms, 160 ms, 320 ms, 640 ms, or 1280 ms. Other cycle lengths may be reintroduced for NB-IoT devices to reduce latency.

This configuration may also enable the UE to include a separate WUR, as described above. The configuration may allow for the delay of the DRX cycle where the UE can wake up the main receiver and if desired, also acquire system information of the system (if changed). This may allow the UE to exploit even deeper power saving states even for WUS cycles as short as 2.56 s, thus providing a low-latency solution at high power savings.

Alternatively, the number of DRX cycles in the PTW following a WUS can be predefined (i.e. specified in the spec). For example, the next N DRX cycles after duration M from the end of WUS monitoring occasions may be used. In this case. M can be predefined or configured via RRC signaling.

The power savings achieved by a UE may be increased as the UE wakes up less often to monitor a Paging message not directed to itself. Thus, if the number of UEs monitoring the WUS is reduced compared to the ones supposed to be monitoring the PO, greater power savings may be obtained. This could be achieved by creating sub-groups of UEs.

To effect this, in a first set of embodiments a UE-specific ID may be used as a payload within the WUS. In this case, the WUS payload may contain the UE-specific ID. This may be more feasible for CAT-M1 devices which have more resources to specify both the WUS and the payload rather than just the WUS alone. Specifying the UE identifier as payload may then save considerable resources spent in sending the Paging message for the UE, but on the other hand may also increase the size of the WUS which would be larger compared to the size of the paging message. It may, moreover, be hard to include multiple UE IDs as part of the WUS payload. However, given that there are multiple NBs in a given LTE bandwidth for CAT-M1 devices, the UEs could monitor different NBs for their payloads.

In a second set of embodiments, as the size of the UE identifier is 40 bits for the S-TMSI or the 64-bits for the IMSI (in case the S-TMSI has become invalid for whatever reason), the network may not have enough resources to generate a WUS message containing one or more S-TMSIs for all the UEs to be paged. In this case, a compromise option may be used in which WUS group IDs are assigned to a group of UEs based on their UE IDs (i.e. UE_ID mod Nw) where Nw is the size of the WUS group. Nw may be determined by the network and may be smaller than the size of the group monitoring the POs.

The payload can be transmitted by MPDCCH/NPDCCH or MPDSCH/NPDSCH. Alternatively, the payload may be transmitted using a new waveform altogether that can be deciphered by the separate low-power WUR The WUS can be used for channel estimation for the reception of the payload.

In a third set of embodiments, multiple WUS signals for multiple groups may be simultaneously sent within the same WUS occasion. In this case, the WUS may include only the WUS preamble. For WUS sequences having multiple orthogonal sequences, such as ZC-sequences with varying roots, or m-sequences, then the groups of UEs monitoring the PO may be further divided into two. In one example, the orthogonality between two sequences can be achieved by applying OCC in the time domain. In that case, there may be 2 groups of UEs for each WUS occasion. Each group may be assigned a separate signal sequence for e.g. WUSG1 and WUSG2 and also a Go-to-sleep (GTS) signal that would be the same for both.

The UE may thus receive 4 possible signals. The first signal may include WUSG1 and GTS. If only the UEs in WUSG1 are being paged, then the eNB may transmit a combination of WUSG1 and GTS during the WUS occasion. The UEs monitoring the WUS occasion may detect this signal and match the signal to their own group or to the GTS. If the UEs belong to WUSG1, a positive match results and the UEs may wake up to monitor the PDCCH. However, if the UEs belong to WUSG2, the UEs may obtain a positive correlation with the GTS signal and would thus go back to sleep. The second signal may include WUSG2 and GTS and be the analog of the above for UEs in WUSG2. The third signal may be GTS alone: if there is no wake up for either of the groups, the eNB may only transmit the GTS signal. The last signal is WUSG1+WUSG2, in which both groups of UEs are to wake-up.

The benefit of this method is that the same resource may be re-used for two groups, but the wake-up frequency would be halved, thus improving power savings while keeping the resource allocation low. The UE complexity would also not increase very much since the UE only has to match 2 hypothesis rather than 3, but may have to increase the UE complexity to separate the two signals. However, the missed detection probability may increase due to the power being split between 2 different signals rather than on only one signal.

In a fourth set of embodiments, different WUS sequences may be assigned for different WUS group combinations within the same WUS occasion. In this case, the eNB may only transmit one signal at a time, but more sequences may exist for each combination. Thus, if, for example, the UEs monitoring a given PO were sub-divided into 2 groups as described above. Then, as 4 different combinations are possible, 4 different sequences may be sent.

The first sequence may be WUSG1. When the UEs receive this sequence, both sets of UEs may decode the WUS, get a match and determine that the WUS is for the WUSG1 group. Thus, only UEs belonging to WUSG1 would wake-up, while UEs belonging to WUSG2 would go back to sleep. However, both groups of UEs may correctly be able to decode the signal to obtain time/frequency synchronization. The second sequence may be WUSG2, which is similar to the above for the WUSG2 UEs. The third sequence may be GTS, which may be transmitted when neither UE group is to be woken up. The fourth sequence may be WUSG1G2, which may be transmitted when both UE groups are to be woken up.

The benefit of this approach is that the missed detection probability may not increase due to the transmit power split between two signals. However, the UE complexity may increase as the UE now has to match 4 different hypotheses to know what the UE is supposed to do. This solution may also have the benefit of re-using resources and also lowering power savings through less frequent wake-ups.

In a fourth set of embodiments, different WUS resources may be assigned for different WUS groups. Here the UEs may be assigned different WUS resources altogether depending on the group to which UE belongs. This may be expensive from the system resource perspective, but may be beneficial from UE power savings perspective as the UEs only detect their own signals.

In addition to the WUS, reduced system acquisition time and downlink channel power efficiency may enable energy savings for MTC type devices. CAT-M1. These may overlap the cell search time which is part of the system acquisition time might be reduced if a periodic sync signal that could be acquired faster than the existing primary and secondary synchronization signals for efeMTC devices could be used.

A higher signal energy available to the UE for synchronization purposes may be used for a new periodic resync signal (RSS) to perform better than existing synchronization signals. This may indicate an increase in the signal length to provide the UE with timing/frequency synchronization within a certain timing accuracy level as well as information regarding the serving cell ID. This latter information may enable the UE to subsequently be able to correctly detect and decode the WUS (which may follow after a period of a few hundred milliseconds) with 99% or better reliability. In some embodiments, both the resync signal and the WUS may be cell-specific, for example, to ensure a UE in one cell does not inadvertently detect a WUS of the neighboring cell, when the UE cell is DTX.

A new periodic sync signal along with the WUS may be able to significantly shorten the system acquisition time as well reduce UE power consumption by as much as 40-80% depending on UE's coverage level. Such signals may thus be highly useful for MTC devices which have very long battery lifetime requirements, in terms of 5-10 years.

The PHY resources available to use for the RSS may have a frequency span equal to that of six PRBs, each spanning 12 OFDM subcarriers. The time span of a PRB may be 14 symbols, of which 11 can be allocated to the RSS without allocation conflicts with other MTC PHY elements. Alternatively, the number of symbols allocated to RSS can be configured, depending on the number of symbols used for PDCCH. In one example, 14-N symbols can be used for RSS if N symbols are configured for PDCCH. The total number of RSS symbols that exactly fill a PRB allocation may be 72 subcarriers by 11 symbols, or 792. These 792 locations may be filled by code symbols from 792 length Zadoff-Chu sequence. The location indices of the 792 code symbols may be numbered from 0 to 791. Likewise, the 72 subcarriers may be numbered 0 to 71 and the 11 symbols numbered from 0 to 10. Algebraically, if the subcarrier index is k, the symbol index is m, and the Zadoff-Chu code symbol index is n, then the mapping of the code symbols to the subcarriers and symbols may be n=72*m+k. To support the association of a RSS to a CellID, cyclic shifts of the mapping may be made. These shifts may be made at two subcarrier increments to provide adequate cross-correlation suppression in the event of minor to moderate frequency offsets. If a portion of the CellID address space is defined over the interval from 0 to 395 and designated p, then the mapping for the p$^{th}$ RSS may be n(p)=[72*m+k+2p]mod 792. Alternatively, different root indexes can be used to indicate part of the cell ID.

In another embodiment, a length-72 sequence can be used. The sequence can be repeated over X symbols, where X is the number of symbols in a subframe that can be used for the RSS. A scrambling code can be added to the repeated X symbols, e.g. a length-X Barker code, Hadamard sequence, or ZC sequence, or cover code [1, 1, 1, 1, −1, −1, 1, 1, 1, −1, 1] as in NB-IoT when X=11 can be used. Alternatively, different length-72 sequences can be applied to different symbols, e.g. a length-72 ZC sequence with different root indexes.

There are a few ways in which the RSS and the WUS may be structured to ensure that the signals are cell-specific. In a first embodiment, the signals may be RSS (1 . . . m bits of last significant bits of PCell ID)+WUS (9-m) bits of PCell ID info. In this embodiment, the WUS may also carry cell-specific information by considering multiple sequences, though the Physical Cell ID space covered by the WUS may be smaller than that covered by the RSS. For example, the space covered by the WUS may be only 4-8 sequence combinations (2-3 bits). The WUS can also carry the WUS Group ID information, where each cell may have up to n groups and where n represents the number of UE groups in a given cell. In some embodiments, n can range from 1 to 4. The information on the number of groups for WUS in a cell may be broadcast by the eNB as part of its system information, or predefined in the 3GPP specification.

In some embodiments, the WUS may carry overlapping bits of the PCell ID with the RSS and the RSS covers the entire PCell ID space, i.e. carries all 504 Cell IDs. Alternatively, the WUS may carry bits of the PCell ID not covered by the RSS signal, thereby letting the UE combine the two pieces of information in the signals and thus check if its cell ID has indeed remained unchanged without re-acquiring the PSS/SSS.

In a second embodiment, the RSS only may carry Cell specific information. The WUS only may carry a Group ID for the UEs.

In a second embodiment, the RSS only may carry Cell specific information. The WUS may not carry any information. This is to say that the WUS may have a preamble but no payload and the presence or absence of the WUS may indicate the 1 bit of information regarding whether the UE should wake up or not.

The overall process flow may be similar to that already shown. That is, the UE may be either Light Sleep or Deep Sleep, depending on DRX/eDRX cycle for the UE. The UE may wake up to detect the periodic RSS. After waking up, the UE may resolve m bits of the Cell ID where m=1 . . . 9. If the signal is correctly detected, the UE may be time/frequency synchronized with at least +/−10% timing accuracy. In this case, the UE may also perform reference measurements of the RSS.

After waking up, three outcomes are possible. A "no error" outcome may occur in which the UE detects the RSS and is within the range of time/frequency accuracy to be used. An "error" outcome may occur in which the UE detects the RSS but is not within the range of time/frequency accuracy to be used. A "no signal" outcome may occur in which the UE fails to detect the RSS as the RSS does not pass the threshold.

After the detection attempt, the UE may enter light sleep. In this mode, the LO may be active and have a very low error +/−0.05 ppm/s. The UE may then wake up to detect the WUS. After waking up, three WUS outcomes are again possible. The WUS may have been transmitted by the eNB and correctly received, the WUS may not have been sent but detect (i.e., a false detection), or the WUS may have been sent but not received (i.e., a missed detection).

As above, to reduce power consumption the UE may contain a WUR that may be separate from the main receiver. To reiterate, in current mechanisms for power management in cellular modems, the modem is used to monitor the existing control channel (PDCCH) on a cyclical basis. In this case, the modem duty may cycle between different power states (DRX) to save energy. However, monitoring the control channel for a possible downlink grant or a control message is an expensive operation in terms of energy consumption, particularly when in most cases, there is no downlink grant or control message contained within the control channel for the UE. To reduce this energy consumption, the WUR may be used.

Instead of monitoring the existing PDCCH for a message such as a paging message during idle DRX or a downlink data grant or control message to the UE during connected state DRX, the modem may monitor a pre-determined frequency and bandwidth for the WUS. The WUS may use lower energy to decode and detect, both as the WUS is less complex than the PDCCH and the WUS may arrive within a fixed time-frequency window rather than an unknown location within the bandwidth that may be determined by blind decoding of the PDCCH. Instead, the WUR will be based on a burst-based packet architecture.

Figure 16:
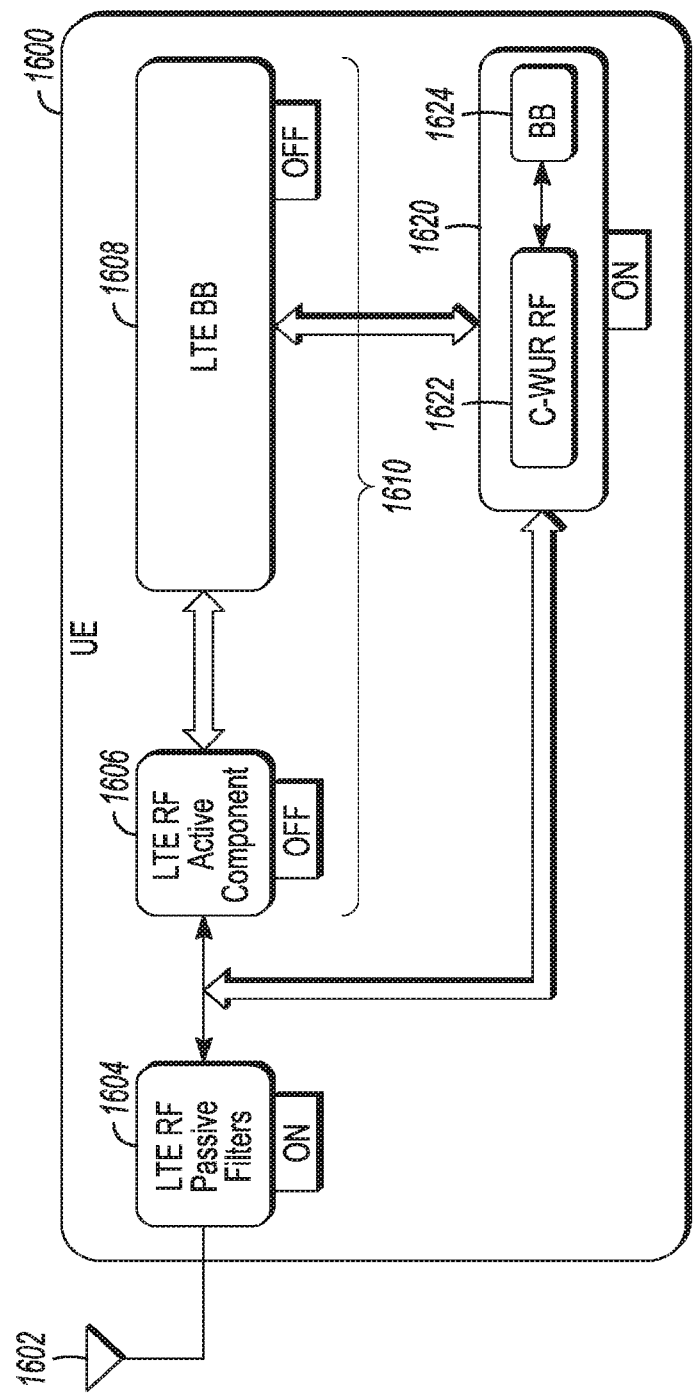
FIG. 16 illustrates a receiver containing a WUR in accordance with some embodiments.

FIG. 16 illustrates a receiver containing a WUR in accordance with some embodiments. The UE 1600 may be shown and described above. Additional components may be present, but are not shown for convenience. The UE 1600 may contain one or more antennas 1602, that are configured to receive control signals and the WUS, among others. The received signals may be supplied to passive filters 1604, which may consume at most a limited amount of power, but typically may be expensive in cost and PCB area. The passive filters 1604 may filter the received signals into the band of interest (e.g., frequency components where the WUS is located), and may be lowpass filters.

The signals from the passive filters 1604 may be supplied to either an RF active receiver 1610 or a WUR 1620. The RF active receiver 1610 may include RF active components 1606 and a baseband processor 1608. Note that here, as in portions of the description, processor and processing circuitry (or processing module circuitry) may be synonymous. The signals supplied to the RF active components 1606 may be provided to the main (and perhaps only) baseband processor 1608. Thus, the signals supplied to the RF active receiver 1610 may include control signals, for example on the PDCCH, and data signals, for example on the PDSCH.

The WUR 1620 may be a dedicated receive chain that contains an entirely separate radio receiver, including Analog/Digital RF circuitry. The WUR 1620 (also called a cellular WUR or CWUR) may include both active WUR RF components 1622 and a separate WUR baseband processor 1624. The WUR baseband processor 1624 may be more limited than the baseband processor 1608. In some embodiments, the WUR baseband processor 1624 may not be separate, instead being a subset of functions of the baseband processor 1608. The WUR 1608 may tap the signal (the WUS) from the passive filters 1604 to reduce the power consumption. Unlike Wi-Fi and short-range wireless sensor network receivers, a WUR has not been explored in the cellular context due to the challenges of meeting very low sensitivity requirements and overcoming high interference from adjacent channels while still consuming little energy. The WUR 1620 may be optimized to receive a simple On-Off Keying (OOK)/Frequency Shift Keying (FSK)/Phase Shift Keying (PSK) modulated signal, and tradeoff a high Noise Figure to achieve low power consumption.

In some embodiments, the components in the RF active receiver 1610 and the WUR 1620 may be deactivated when the particular receiver is not being used. Thus, to save power, the RF active receiver 1610 may be deactivated when the WUS is received and the WUR 1620 may be deactivated when, for example, the PDCCH is received. Thus, when the WUS is to be received, the entire Rx chain of the main cellular modem receiver 1610, typically optimized for high throughput, may be switched off and the separate radio receiver WUS 1620 that also satisfies the requirements of the LTE protocol in terms of sensitivity and adjacent channel interference may instead be used.

Such a solution may be power-optimized by using a separate, low power receiver at the cost of adding an entirely new radio receiver chain for the wake-up signal, it may result in cost increases and also may present integration issues with the main cellular receiver. Given the architecture shown in FIG. 16, the WUR RF components may satisfy the in-band interference and adjacent channel interference requirements for the LTE receiver. This may, in some cases, be as high as Refsens signal −56 dBm (from reference Table 7.6, in 3GPP TS 36.101). These requirements may be difficult to meet under a low power budget of 5 mW or less.

Figure 17:
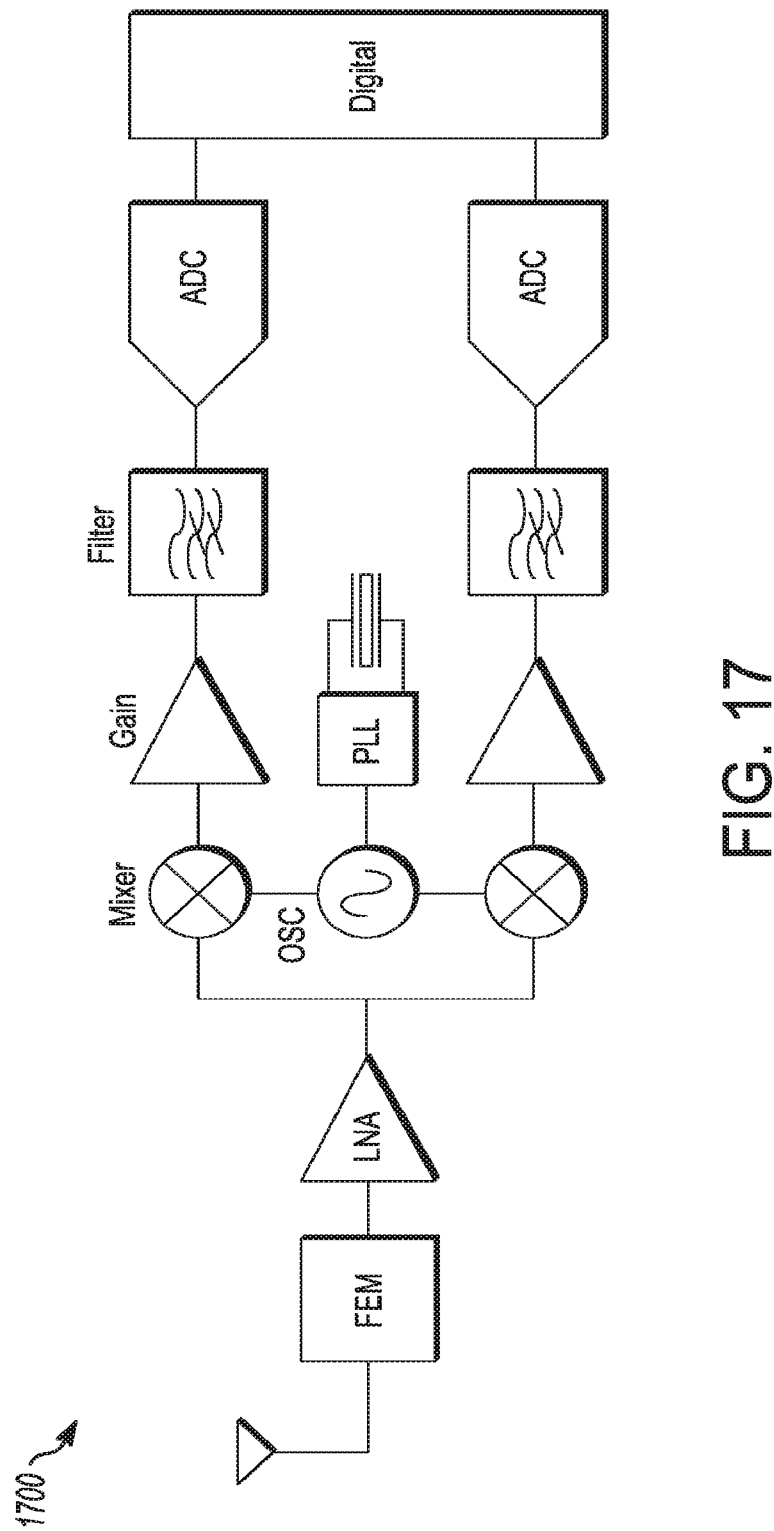
FIG. 17 illustrates a transceiver architecture in accordance with some embodiments.
Figure 18:
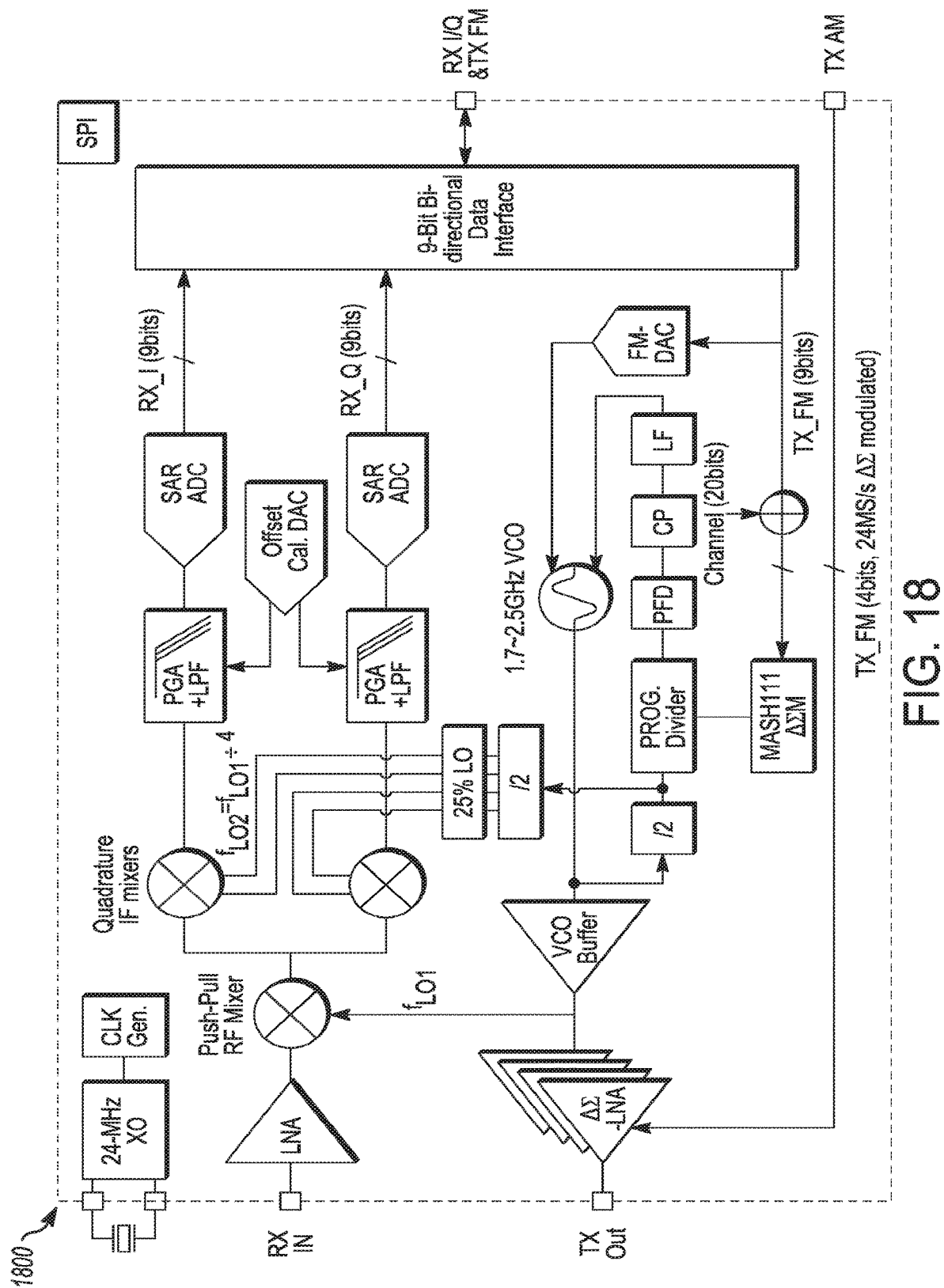
FIG. 18 illustrates a transceiver architecture in accordance with some embodiments.

FIG. 17 illustrates a transceiver architecture in accordance with some embodiments. FIG. 18 illustrates a transceiver architecture in accordance with some embodiments. The transceiver architecture 1700, 1800 may be used in the UE shown in the above figures. The transceiver architecture 1700, 1800 may include a front end module (FEM) and low noise amplifier (LNA) that may be common to multiple receiver paths. The signal from the LNA may be supplied to different mixers to which a common oscillator signal from an oscillator is supplied. The mixers may be quadrature mixers that provide an in-phase (I) and quadrature-phase (Q) signals. The oscillator may be controlled by a phase locked loop (PLL) that uses a piezoelectric oscillator to set the desired oscillator frequency. Each receiver path further may amplify the signal from the mixer using an amplifier, such as a power amplifier, before the amplified signal is supplied to a filter. The filter may be a lowpass filter. The filtered signal may then be digitized at an analog-to-digital converter (ADC) before being further processed.

FIG. 18 shows the transmit path as well as the receive path, as well as slight changes from the architecture of FIG. 17. The receiver part of the structure in FIG. 18 may serve as a benchmark for the WUR architecture, consuming ~3.8 mW with a minimum sensitivity of −98 dBm. Among the most power-hungry components of the WUR may be the local oscillator. A low-cost, low-power oscillator can contribute to high phase noise within the receiver, thus reducing the sensitivity of the receiver or using a large amount of gain in terms of modulation/coding to overcome the noise.

In some embodiments, a reference ring oscillator may be used. The phase noise characteristics of a reference ring oscillator design @−85 dBc/Hz may consume only 1 mW. The overall receiver design may consume about 5 mW. However, such a receiver may only be able to support simple (BPSK/QPSK) modulation schemes. The low bitrates may thus use very long wake-up signals ranging from 10 ms-80 ms as shown in Table 1, which may show also other modulation techniques such as minimum shift keying (MSK). In some embodiments, the WUS uses a modulation scheme of lower order (less complexity) than the PDCCH. The WUS may, in some embodiments, use a modulation scheme of at most 8QAM.

TABLE 1

WUR signal durations for different MCS schemes assuming above architecture

| Modulation Scheme | $E_b/N_a$ at $10^{-3}$ BER (dB) | Data Rate (Kbps) | Wake-up signal (48 bits) duration (ms) |
|---|---|---|---|
| Non-coherent OOK, OFSK | 11 | 0.87 | ~55 |
| Coherent OOK, OFSK | 9 | 1.7 | ~28 |
| MSK, PSK | 7 | * | — |
| DBPSK | 8 | 6** | ~8 ms (using 360 khz) |

In some embodiments, the WUR baseband processor may be designed as a burst packet-based receiver. As described above, for example in relation to FIG. 13, this is unlike cellular technologies such as CDMA/UMTS/LTE-A/NB-IoT etc. in that a burst packet-based receiver may not use tracking reference signals to maintain a strict time/frequency alignment with the control channel to be able to correctly decode the information sent. This may allow the WUR to relax the synchronization overhead and save power. The WUR may operate in a duty cycle similar to how an LTE receiver operates in the DRX duty cycle. During this duty cycle, the WUR may look for a pre-determined signal pattern in a frequency band and time offset that have been fixed a-priori (either predetermined by the 3GPP standard or indicated to the UE via higher layer signaling).

As described in relation to FIG. 13, the WUR baseband processor may be asleep, with the only component that remains powered on during the OFF periods of WUR cycle being a coarse-grained Real Time Clock (RTC) (32 kHz) with a time drift up to 20 ppm. The RTC may keep time during the OFF cycle and wake up the WUR. Upon waking, the WUR may start checking the signal to see whether the predetermined preamble sequence can be detected. In embodiments in which the WUS contains both a preamble and payload, once the WUR detects the preamble sequence, the WUR may process the signal to obtain time and frequency synchronization. This may permit the WUR to process the following payload as shown in the block titled "Burst Data Detection."

As above, the WUS ideally would be quite simple and use a low-order modulation scheme such as OOK. FSK, and DBPSK etc. Table 1 above shows an analysis of the estimated length of the WUS using the above schemes.

Figure 19:
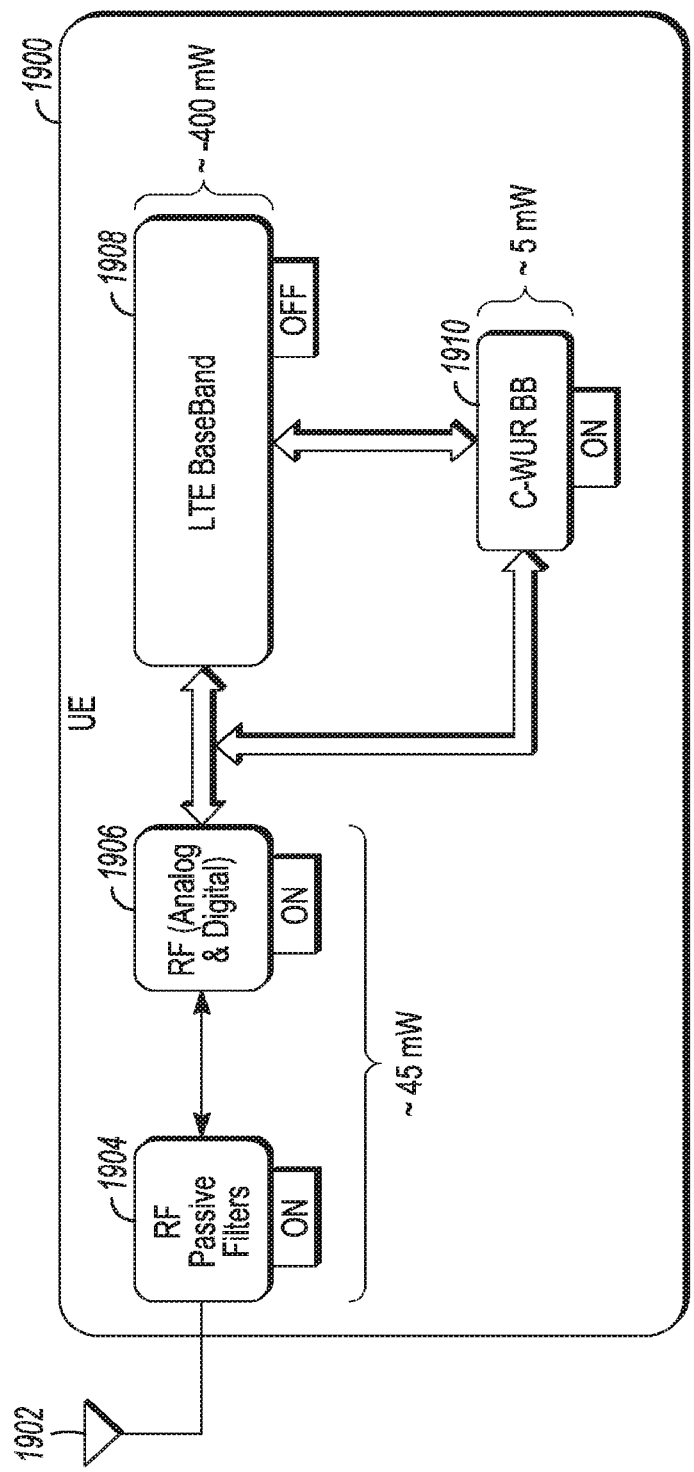
FIG. 19 illustrates a receiver containing a WUR in accordance with some embodiments.

To address the above, the existing receiver chain may be re-used. FIG. 19 illustrates a receiver containing a WUR in accordance with some embodiments. The UE 1900 may be the same as that shown in previous figures. In some embodiments, the RF analog front-end and digital filtering components may be re-used for detection of the WUS. The re-use of existing RF part may permit both high sensitivity and selectivity as well as design simplification and cost reduction. Further optimization of the existing receiver may also be used.

In particular, as shown the UE 1900 may contain one or more antennas 1902 that are configured to receive control signals and the WUS, among others. The received signals may be supplied to passive filters 1904. The passive filters 1904 may filter the received signals into the band of interest (e.g., frequency components where the WUS is located), and may be lowpass filters. The signals from the passive filters 1904 may be supplied to analog and/or digital RF components 1906. The signal from the RF components 1906 may be supplied to either an LTE baseband processor 1908 or a WUR baseband processor 1910, dependent on whether the signal is a control/data signal or the WUS. In this case, for a WUS, all of the circuitry other than the LTE baseband processor 1908 may be active. The use of a single Rx chain to receive and process the LTE signal may reduce the power consumption of the UE 1900.

In some embodiments, the only new component used may be the baseband physical layer processing circuitry of the WUR to process the WUS, indicated in FIG. 19 as the C-WUR 1910. One benefit of such a solution is that re-using the existing RF receiver circuitry (e.g., RF analog front-end filters, ADCs, LNAs, mixers, oscillators, digital filters used for interference cancellation) may vastly simplify the design process for the WUR and reduce the cost and silicon area use by the receiver. Since the existing RF transceiver is already designed to meet the LTE specifications, the resulting WUR may already be fit into the LTE system without being affected by the adjacent LTE users. The existing RF can support complex modulation schemes such as 64QAM and 256QAM, so there may be more options available for the WUS waveform design instead of being restricted to OOK/FSK/PSK.

In addition, the existing receiver chain components may be optimized for a WUR mode through optimizations such as voltage and frequency scaling, reducing A/D sampling rates, and reducing the current consumed by the local oscillators so as to increase the higher noise figure for the low-complexity WUS. However, the power consumption may not be as low as the design when creating a customized radio.

In some embodiments, the local oscillator may be operated for WUS detection at a lower current than for PDCCH detection, thus operating at a higher Noise Figure (NF). Since the WUS may not use complex modulation schemes such as 16QAM or higher, unlike the PDCCH, the SNR requirements may be lower than the PDCCH. This may thus allow for the tolerance for a higher NF. Unlike the main receiver which may be designed in accordance with UL/DL isolation requirements for a FDD system, further optimization may be used due to the relaxed UL interference requirements since the WUR may only operate in receive mode. Moreover, a different external timing reference can be used for the receiver when the receiver is used in the WUR mode. In one example, a very low power RTC may be used. Further configurability of RF analog blocks can allow for additional power saving; for example: reduction of ADC resolution and sampling rate, and bypassing of filters and gain blocks, etc.

Figure 20:
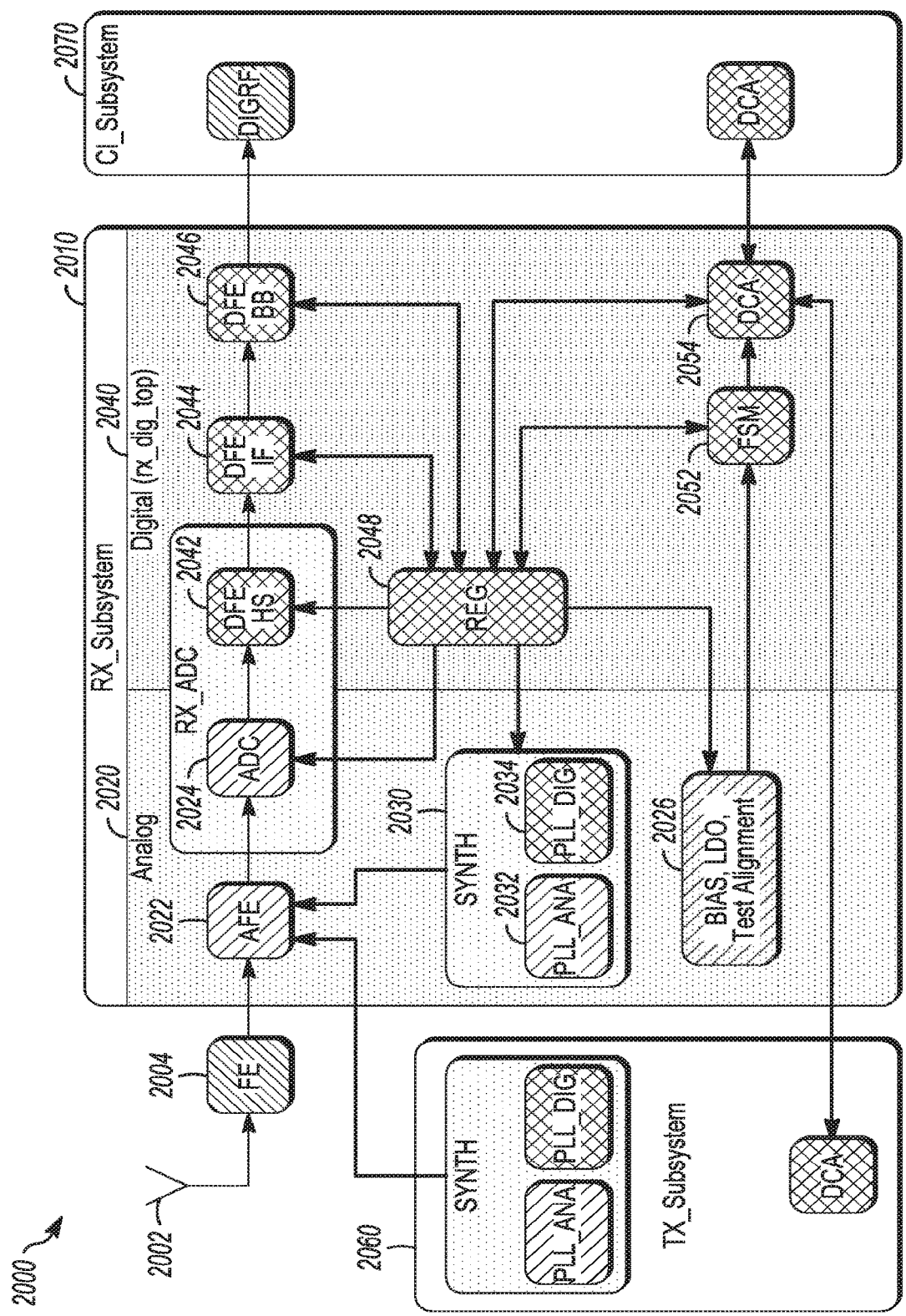
FIG. 20 illustrates a single chain receiver in accordance with some embodiments.

FIG. 20 illustrates a single chain receiver in accordance with some embodiments. The UE containing the single chain receiver 2000 may be shown and described in previous figures. Some components may not be shown in FIG. 20 for convenience. The single chain receiver 2000 may contain one or more antennas 2002 that transmit and receive various signals, a front end (FE) 2004, and different subsystems, which include a Tx subsystem 2060, a Rx subsystem 2010 and a control interface (CI) subsystem 2070.

The Rx subsystem 2010 may contain an analog portion 2020 and a digital portion 2040. The analog portion 2020 may contain an analog front end (AFE) 2022 to which the signal from the front end 2004 is supplied. The AFE 2022 may provide a signal to an ADC 2024 to convert the analog signal into a digital signal. The analog portion 2020 may also contain a synthethizer 2030 that contains an analog PLL 2032 and a digital PLL 2034, which may also be provided in the Tx subsystem 2060. The resulting oscillator signal may be supplied to the AFE 2022. The oscillator signal in FIG. 20, as in FIGS. 16 and 19, thus may be from a low-power oscillator that satisfies the phase noise requirements for the WUR. The analog portion 2020 may also contain regulation circuitry 2026.

The digital portion 2040 may contain a digital front end (DFE HS) 2042 to which the signal from the ADC 2024 is supplied. The DFE 2042 may provide a signal to an interference filter (DFE IF) 2044, whose signal may be supplied to a baseband processor (DFE BB) 2046. The DFE BB 2046 may process the received signal. The signal from the DFE BB 2046 may be supplied to the CI subsystem 2070, where the signal may be provided as a digital RF output. The digital portion 2040 may also contain a regulator 2048 that provides information to the ADC 2024, the DFE HS 2042, the Synth 2030 and the regulation circuitry 2026. The regulator 2048 may also communicate with the DFE IF 2044, the DFE BB 2046, a finite state machine (FSM) 2052 and a dynamic channel assignment (DCA) 2054. The DCA 2054 may communicate with a DCA in the Tx subsystem 2060 and in the CI subsystem 2070.

The process flow of the receiver shown in FIG. 20 may be similar to that described in relation to FIG. 13. As above, the above baseband module design may have better RF components, consequently having a lower NF. This may lead to the baseband module performing less processing to decode the WUS within the bit error rate (BER) requirements. The WUR may be able to support higher order modulation schemes such as DBPSK, QPSK etc. his may allow the WUR to re-use existing components from main receiver, further reducing cost and also reducing the amount of resources consumed on the LTE air interface.

EXAMPLES

Example 1 is an apparatus of user equipment (UE), the apparatus comprising: processing circuitry arranged to: generate signaling to wake up a wake-up receiver (WUR) from one of an idle mode or connected mode Discontinuous Reception (cDRX) state; determine whether a wake-up signal (WUS) has been received by the WUR from an evolved NodeB (eNB); in response to a determination that the WUS has been received, generate signaling to wake up a transceiver for reception of a physical downlink control channel (PDCCH) for the UE in a paging occasion (PO) when the UE is in the idle mode or for reception of a physical downlink shared channel (PDSCH) for the UE when the UE is in the cDRX state; and in response to a determination that the WUS has not been received, remain in the one of the idle mode or cDRX state; a memory configured to store the WUS.

In Example 2, the subject matter of Example 1 includes, wherein the processing circuitry is further configured to: determine whether the WUS has been received by decoding a preamble sequence of the WUS, the preamble sequence comprising a Zadoff-Chu (ZC) sequence that comprises at least one of a different root index or different length than a legacy primary synchronization signal, legacy secondary synchronization signal and demodulation reference signal.

In Example 3, the subject matter of Examples 1-2 includes, wherein, the processing circuitry is further configured to determine whether the WUS has been received by decoding a preamble sequence of the WUS, the preamble sequence comprising a pseudo-random sequence that is different from a Cell Specific Reference Signal (CRS) and Narrowband Reference Signal (NRS), and the pseudo-random sequence is one of: common to all cells and the pseudo-random sequence is generated using a default cell identification (ID), cell-specific and the pseudo-random sequence is defined as a function of a cell ID of the eNB, UE-group specific and the pseudo-random sequence is defined by a mapping indicated by mod (UE-group ID, N), where N is a number of available pseudo-random sequences to be used, or UE-specific and the pseudo-random sequence is defined by a mapping indicated by mod (UE ID, N), where N is the number of available pseudo-random sequences to be used.

In Example 4, the subject matter of Examples 1-3 includes, wherein: the processing circuitry is further configured to determine whether the WUS has been received by decoding a preamble sequence of the WUS, the preamble sequence comprising a pseudo-random sequence that is dependent on one of a subframe or slot index, and the WUS is based on a default value for the one of the subframe or slot index.

In Example 5, the subject matter of Examples 1-4 includes, wherein: the WUS is one of a first sequence that indicates the presence of one of a PDCCH or PDSCH alone or a second sequence that indicates the presence of the one of the PDCCH or PDSCH in combination with additional information.

In Example 6, the subject matter of Example 5 includes, wherein: the second sequence indicates a system information update or public warning system (PWS) related information.

In Example 7, the subject matter of Examples 1-6 includes, wherein at least one of: resource elements (REs) containing reference signals that overlap the WUS are punctured to carry the WUS, or the WUS is mapped around the REs and the WUS is rate matched around the REs.

In Example 8, the subject matter of Examples 1-7 includes, wherein, the WUS is a 1-bit preamble sequence that indicates whether to wake up.

In Example 9, the subject matter of Examples 1-8 includes, wherein the processing circuitry is further configured to: use the WUS for at least one of time and frequency synchronization with the eNB or channel estimation.

In Example 10, the subject matter of Examples 1-9 includes, wherein: the preamble sequence is different dependent on a UE capability.

In Example 11, the subject matter of Example 10 includes, wherein: the UE capability indicates whether the UE is an Even Further Enhanced Machine Type Communication (efeMTC) UE or a Narrowband-Internet of Things (NB-IoT) UE.

In Example 12, the subject matter of Examples 1-11 includes, wherein the processing circuitry is further configured to: decode a configuration from the eNB that indicates that the WUS is supported by the eNB.

In Example 13, the subject matter of Example 12 includes, wherein: the configuration is cell-specific and indicates a maximum number of repetitions of the WUS.

In Example 14, the subject matter of Example 13 includes, wherein: the maximum number of repetitions of the WUS is dependent on a coverage level of the UE.

In Example 15, the subject matter of Examples 12-14 includes, wherein: the configuration indicates that the WUS is continuous when the one of the PDCCH or PDSCH is intended for the UE.

In Example 16, the subject matter of Example 15 includes, wherein the processing circuitry is further configured to: determine whether a measurement of a reference signal meets a predetermined threshold; monitor for the WUS in response to a determination that the measurement meets the predetermined threshold; and monitor for legacy paging messages in response to a determination that the measurement is less than the predetermined threshold.

In Example 17, the subject matter of Examples 12-16 includes, wherein the processing circuitry is further configured to: encode, for transmission to the eNB, an indication that the UE will use the WUS, the WUS received by the UE in response to transmission of the indication.

In Example 18, the subject matter of Examples 1-17 includes, wherein: the WUS is received at a predetermined time offset from a start of the paging occasion when the UE is in idle mode or active time when the UE is in the cDRX, the time offset different when the UE is in idle mode than w % ben the UE is in cDRX.

In Example 19, the subject matter of Examples 1-18 includes, wherein: the WUS spans a plurality of successive physical resource blocks (PRBs) in a same frequency band, the WUS free from overlap with control channels that use the same frequency band.

In Example 20, the subject matter of Examples 1-19 includes, wherein the processing circuitry is further arranged to: configure the WUR to receive the WUS periodically, independent of paging occasions or on duration periods of the cDRX state.

In Example 21, the subject matter of Examples 1-20 includes, wherein: the WUS is received on a physical resource block (PRB) configured by the eNB via higher layer signaling, independent of a PRB or narrowband configured for paging monitoring and for monitoring in a connected state.

In Example 22, the subject matter of Examples 1-21 includes, wherein: the WUS is received on a physical resource block (PRB) or narrowband, dependent on a type of UE, configured for paging monitoring when the UE is in the idle state and for PDCCH monitoring when the UE is in the cDRX.

In Example 23, the subject matter of Examples 1-22 includes, wherein: the PO is a PO immediately after a search space defined for the WUS.

In Example 24, the subject matter of Examples 1-23 includes, wherein at least one of: the WUS uses a modulation scheme of lower order than the PDCCH, the WUS comprises a preamble sequence that has low cross-correlation with primary and secondary synchronization signals and demodulation reference signals, or the WUS comprises a design dependent on whether the WUS is always sent during a wake-up epoch, whether the WUS provides cell synchronization for the UE and whether the preamble sequence is used to demodulate a payload of the WUS.

In Example 25, the subject matter of Examples 1-24 includes: wherein the processing circuitry comprises: a first baseband processor in the WUR configured decode the WUS, and a second baseband processor in the transceiver configured to decode the PDCCH, and the first baseband processor is deactivated during reception of the PDCCH and the second baseband processor is deactivated during reception of the WUS.

In Example 26, the subject matter of Example 25 includes, wherein: the first and second baseband processors are disposed in different receiver chains, each receiver chain having active analog and digital radio frequency (RF) components, the receiver chain associated with the first baseband filter configured to tap a signal from passive filters of the receiver chain associated with the second baseband filter.

In Example 27, the subject matter of Example 26 includes, wherein the processing circuitry is further arranged to: decode the WUS over a duration dependent on the modulation scheme of the WUS.

In Example 28, the subject matter of Examples 25-27 includes, wherein: the first and second baseband processors share active and passive analog and digital radio frequency (RF) of a same receiver chain, the first baseband filter configured to tap a signal supplied to the second baseband filter.

In Example 29, the subject matter of Examples 25-28 includes, wherein the processing circuitry is further arranged to: operate the WUR in receive mode only, and use different external timing references dependent on whether the WUR is in operation.

Example 30 is an apparatus of evolved NodeB (eNB), the apparatus comprising: processing circuitry arranged to: determine that a user equipment (UE) supports use of a wake-up signal (WUS) when in one of an idle mode or connected mode Discontinuous Reception (cDRX) state; determine that data is to be transmitted to the UE when the UE is in the idle mode or cDRX state; in response to a determination that the data is to be transmitted to the UE when the UE is in the idle mode or cDRX state, encode the WUS for transmission to the UE, the WUS comprising a sequence that is less complicated than a physical downlink control channel (PDCCH); and encode, for transmission to the UE after transmission of the WUS, one of: paging information during a paging occasion (PO) when the UE is in the idle mode, the paging information encoded for the UE, or a physical downlink shared channel (PDSCH) when the UE is in the cDRX state, the PDSCH encoded for the UE; and a memory configured to store the WUS.

In Example 31, the subject matter of Example 30 includes, wherein: the sequence is a Zadoff-Chu (ZC) sequence that comprises at least one of a different root index or different length than a legacy primary synchronization signal, legacy secondary synchronization signal and demodulation reference signal.

In Example 32, the subject matter of Examples 30-31 includes, wherein: the ZC sequence is a UE-group specific ZC sequence, each ZC sequence for a different group of UEs that monitor the paging occasion.

In Example 33, the subject matter of Examples 30-32 includes, wherein: the WUS is limited to a 1-bit preamble that indicates whether to wake up.

Example 34 is a computer-readable storage medium that stores instructions for execution by one or more processors of a user equipment (UE), the one or more processors to configure the UE to, when the instructions are executed: receive a wake-up signal (WUS) configuration from an evolved NodeB (eNB) that indicates that a WUS is supported by the eNB, the WUS being less complicated than a physical downlink control channel (PDCCH) or physical downlink shared channel (PDSCH); enter one of an idle mode or connected mode Discontinuous Reception (cDRX) state; and dependent on a coverage level of the UE, wake up from the one of the idle mode or cDRX state at a resource indicated by the WUS configuration and determine whether the WUS has been received; and in response to a determination that the WUS has been received, wake up for reception of a PDCCH for the UE in a paging occasion (PO) when the UE is in the idle mode or a physical downlink shared channel (PDSCH) for the UE when the UE is in the cDRX state.

In Example 35, the subject matter of Example 34 includes, wherein one of: the instructions, when executed, further configure the UE to monitor for the WUS in response to a determination that the UE is in an area in which the WUS is supported and otherwise monitor for legacy paging, the WUS configuration is cell-specific and indicates a maximum number of repetitions of the WUS; or the WUS is received at a predetermined time offset from a start of the paging occasion when the UE is in idle mode or active time when the UE is in the cDRX state, the time offset different when the UE is in idle mode than when the UE is in cDRX.

Example 36 is at least one machine-readable medium including instructions that, when executed by processing circuitry, cause the processing circuitry to perform operations to implement of any of Examples 1-35.

Example 37 is an apparatus comprising means to implement of any of Examples 1-35.

Example 38 is a system to implement of any of Examples 1-35.

Example 39 is a method to implement of any of Examples 1-35.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for wake-up signal (WUS) reception by a wireless device, comprising:
   determining, while operating in an idle mode, whether a WUS has been received from a base station; and
   monitoring, in response to determining that the WUS has been received, one or more of a Machine Type Communication (MTC) Physical Downlink Control Channel (MPDCCH) or a Narrowband Physical Downlink Control Channel (NPDCCH) in a paging occasion (PO), wherein reception of the WUS is based on a timing offset between the WUS and the PO.

2. The method of claim 1, further comprising:
   skipping, in response to determining that the WUS has not been received, monitoring of the PO while operating in the idle mode.

3. The method of claim 1,
   wherein a WUS frequency resource allocation includes configuration of a subset of Physical Resource Blocks (PRBs) from paging resources.

4. The method of claim 3,
   wherein the subset of PRBs includes a first PRB from the paging resources.

5. The method of claim 1,
   wherein determining, while operating in an idle mode, whether the WUS has been received from the base station is performed based on a Radio Resource Control (RRC) configuration provided by System Information Broadcast (SIB) signaling that indicates that WUS is supported in a cell.

6. The method of claim 1,
   wherein the wireless device comprises a first baseband processor configured to decode the WUS and a second baseband processor configured to decode the MPDCCH or NPDCCH;
   wherein the first baseband processor is deactivated during reception of the MPDCCH or NPDCCH; and
   wherein the second baseband processor is deactivated during reception of the WUS.

7. The method of claim 6,
   wherein the first baseband processor and the second baseband processor are disposed in different receiver chains;
   wherein each receiver chain has active analog and digital radio frequency (RF) components; and
   wherein a receiver chain associated with a first baseband filter is configured to tap a signal from passive filters of a receiver chain associated with a second baseband filter.

8. An apparatus, comprising:
   a memory; and
   one or more baseband processors in communication with the memory and configured to:
   determine, while operating in an idle mode, whether a wake-up signal (WUS) has been received from a base station; and
   monitor, in response to determining that the WUS has been received, one or more of a Machine Type Communication (MTC) Physical Downlink Control Channel (MPDCCH) or a Narrowband Physical Downlink Control Channel (NPDCCH) in a paging occasion (PO), wherein reception of the WUS is based on a timing offset between the WUS and the PO.

9. The apparatus of claim 8,
   wherein the one or more baseband processors are further configured to:
   skip, in response to determining that the WUS has not been received, monitoring of the PO while operating in the idle mode.

10. The apparatus of claim 8,
    wherein a WUS frequency resource allocation includes configuration of a subset of Physical Resource Blocks (PRBs) from paging resources.

11. The apparatus of claim 10,
    wherein the subset of PRBs includes a first PRB from the paging resources.

12. The apparatus of claim 8,
    wherein the determination whether the WUS has been received is performed based on a Radio Resource Control (RRC) configuration provided by System Information Broadcast (SIB) signaling that indicates that WUS is supported in a cell.

13. The apparatus of claim 8,
    wherein the one or more baseband processors comprise a first baseband processor configured to decode the WUS and a second baseband processor configured to decode the MPDCCH or NPDCCH;
    wherein the first baseband processor is deactivated during reception of the MPDCCH or NPDCCH; and
    wherein the second baseband processor is deactivated during reception of the WUS.

14. The apparatus of claim 13,
    wherein the first baseband processor and the second baseband processor are disposed in different receiver chains;
    wherein each receiver chain has active analog and digital radio frequency (RF) components; and wherein a receiver chain associated with a first baseband filter is configured to tap a signal from passive filters of a receiver chain associated with a second baseband filter.

15. An apparatus, comprising:
a memory; and
processing circuitry arranged to, upon executing instructions stored in the memory, cause the apparatus to:
transmit, to a user equipment (UE) operating in an idle mode, a wake-up signal (WUS); and
transmit to the UE after transmission of the WUS and during a paging occasion (PO), paging information on one or more of a Machine Type Communication (MTC) Physical Downlink Control Channel (MPDCCH) or Narrowband Physical Downlink Control Channel (NPDCCH), wherein transmission of the WUS is based on a timing offset between the WUS and the PO.

16. The apparatus of claim 15,
wherein a WUS frequency resource allocation includes configuration of a subset of Physical Resource Blocks (PRBs) from paging resources.

17. The apparatus of claim 16,
wherein the subset of PRBs includes a first PRB from the paging resources.

18. The apparatus of claim 17,
wherein a Radio Resource Control (RRC) configuration provided by System Information Broadcast (SIB) signaling that indicates that WUS is supported in a cell.

19. An apparatus, comprising:
a memory; and
one or more baseband processors in communication with the memory and configured to:
receive a wake-up signal (WUS) configuration from a base station that indicates that a WUS is supported by the base station, the WUS included in a first physical downlink control channel (PDCCH);
wake up at a resource indicated by the WUS configuration and determine whether the WUS has been received, wherein reception of the WUS is based on a timing offset between the WUS and a start of a connected mode Discontinuous Reception (cDRX) active time; and
in response to a determination that the WUS has been received, wake up for monitoring a second PDCCH during the cDRX active time.

20. The apparatus of claim 19,
wherein the one or more baseband processors are further configured to:
skip, in response to determining that the WUS has not been received, monitoring the second PDCCH.

21. The apparatus of claim 19,
wherein at least one of:
the one or more baseband processors are further configured to monitor for the WUS in response to a determination that the apparatus is in an area in which the WUS is supported and otherwise monitor for legacy paging;
the WUS configuration is cell-specific and indicates a maximum number of repetitions of the WUS; or
the WUS is received at a predetermined time offset from a start of a paging occasion when the apparatus is in idle mode.

22. The apparatus of claim 19,
wherein the one or more baseband processors comprise a first baseband processor configured to decode the WUS and a second baseband processor configured to decode the second PDCCH;
wherein the first baseband processor is deactivated during reception of the PDCCH; and
wherein the second baseband processor is deactivated during reception of the WUS.

23. The apparatus of claim 22,
wherein the first baseband processor and the second baseband processor are disposed in different receiver chains;
wherein each receiver chain has active analog and digital radio frequency (RF) components; and
wherein a receiver chain associated with a first baseband filter is configured to tap a signal from passive filters of a receiver chain associated with a second baseband filter.

24. An apparatus, comprising:
a memory; and
processing circuitry arranged to, upon executing instructions stored in the memory, cause the apparatus to:
transmit, to a user equipment (UE), a wake-up signal (WUS) configuration that indicates support of a WUS, the WUS included in a first physical downlink control channel (PDCCH); and
transmit, to the UE, the WUS, wherein transmission of the WUS is based on a timing offset between the WUS and a start of a connected mode Discontinuous Reception (cDRX) active time.

25. The apparatus of claim 24,
wherein the processing circuitry is further arranged to, upon executing instructions stored in the memory, cause the apparatus to:
transmit, to the UE, a second PDCCH during the cDRX active time.

* * * * *